US008069259B2

(12) United States Patent
Rodriguez et al.

(10) Patent No.: US 8,069,259 B2
(45) Date of Patent: *Nov. 29, 2011

(54) MANAGING REMOVAL OF MEDIA TITLES FROM A LIST

(76) Inventors: Arturo A. Rodriguez, Norcross, GA (US); Robert O. Banker, Cumming, GA (US); Dean F. Jerding, Roswell, GA (US)

(*) Notice: Subject to any disclaimer, the term of this patent is extended or adjusted under 35 U.S.C. 154(b) by 902 days.

This patent is subject to a terminal disclaimer.

(21) Appl. No.: 11/244,621

(22) Filed: Oct. 6, 2005

(65) Prior Publication Data

US 2006/0026665 A1 Feb. 2, 2006

Related U.S. Application Data

(63) Continuation of application No. 09/692,986, filed on Oct. 20, 2000, now Pat. No. 6,978,310, which is a continuation-in-part of application No. 09/590,488, filed on Jun. 9, 2000.

(51) Int. Cl.
*G06F 15/16* (2006.01)
*G06F 15/173* (2006.01)
(52) U.S. Cl. ........ 709/231; 709/203; 709/226; 709/229; 348/14.07
(58) Field of Classification Search .......... 709/202–203, 709/225–229, 231–232; 348/14.03, 14.05, 348/14.07
See application file for complete search history.

(56) References Cited

U.S. PATENT DOCUMENTS

| | | | |
|---|---|---|---|
| 3,676,580 A | 7/1972 | Beck | |
| 4,586,158 A | 4/1986 | Brandle | |
| 4,706,121 A | 11/1987 | Young | |
| 4,751,578 A | 6/1988 | Reiter et al. | |
| 4,821,097 A | 4/1989 | Robbins | |
| 4,827,250 A | 5/1989 | Stallkamp | |
| 4,885,775 A | 12/1989 | Lucas | |
| 4,908,713 A | 3/1990 | Levine | |
| 4,930,158 A | 5/1990 | Vogel | |
| 4,949,187 A | 8/1990 | Cohen | |
| 4,963,994 A | 10/1990 | Levine | |
| 4,984,152 A | 1/1991 | Mueller | |
| 4,991,011 A | 2/1991 | Johnson et al. | |
| 5,038,211 A | 8/1991 | Hallenbeck | |
| 5,172,413 A | 12/1992 | Bradley et al. | |
| 5,191,410 A | 3/1993 | McCalley et al. | |
| 5,253,066 A | 10/1993 | Vogel | |

(Continued)

FOREIGN PATENT DOCUMENTS

CA 2 363 052 A1 11/1995

(Continued)

OTHER PUBLICATIONS

"A Brief History of the Trailer," http://www.movietrailertrash.com/views/history.html, 11 pages (Publicly known at least as early as Dec. 20, 2003).

(Continued)

*Primary Examiner* — Bharat N Barot
(74) *Attorney, Agent, or Firm* — Merchant & Gould

(57) ABSTRACT

The invention can be viewed as a system for providing media information to a user via an interactive media services client device coupled to a programmable television services server device. A method of the preferred embodiment of the present invention includes receiving user input and excluding one or more media titles from a media title list based on the user input.

51 Claims, 16 Drawing Sheets

U.S. PATENT DOCUMENTS

| | | |
|---|---|---|
| 5,291,554 A | 3/1994 | Morales |
| 5,293,357 A | 3/1994 | Hallenbeck |
| 5,317,391 A | 5/1994 | Banker et al. |
| 5,329,590 A | 7/1994 | Pond |
| 5,353,121 A | 10/1994 | Young et al. |
| 5,357,276 A | 10/1994 | Banker et al. |
| 5,359,362 A | 10/1994 | Lewis et al. |
| 5,371,551 A | 12/1994 | Logan et al. |
| 5,398,071 A | 3/1995 | Gove et al. |
| 5,410,326 A | 4/1995 | Goldstein |
| 5,410,343 A | 4/1995 | Coddington et al. |
| 5,410,344 A | 4/1995 | Graves et al. |
| 5,414,455 A | 5/1995 | Hooper et al. |
| 5,418,622 A | 5/1995 | Takeuchi |
| 5,448,313 A | 9/1995 | Kim et al. |
| 5,477,262 A | 12/1995 | Banker et al. |
| 5,479,268 A | 12/1995 | Young et al. ................. 358/335 |
| 5,481,542 A | 1/1996 | Logston et al. |
| 5,483,277 A | 1/1996 | Granger |
| 5,485,216 A | 1/1996 | Lee |
| 5,493,638 A | 2/1996 | Hooper et al. |
| 5,508,815 A | 4/1996 | Levine |
| 5,512,958 A | 4/1996 | Rzeszewski |
| 5,515,495 A | 5/1996 | Ikemoto |
| 5,521,631 A | 5/1996 | Budow et al. |
| 5,530,754 A | 6/1996 | Garfinkle |
| 5,532,735 A | 7/1996 | Blahut et al. |
| 5,532,754 A | 7/1996 | Young et al. |
| 5,544,354 A | 8/1996 | May et al. |
| 5,555,441 A | 9/1996 | Haddad |
| 5,557,541 A | 9/1996 | Schulhof et al. |
| 5,562,732 A | 10/1996 | Eisenberg |
| 5,568,272 A | 10/1996 | Levine |
| 5,583,560 A | 12/1996 | Florin et al. |
| 5,583,995 A | 12/1996 | Gardner et al. |
| 5,585,821 A | 12/1996 | Ishikura et al. |
| 5,585,838 A | 12/1996 | Lawler et al. |
| 5,589,892 A | 12/1996 | Knee et al. |
| 5,592,551 A | 1/1997 | Lett et al. |
| 5,594,509 A | 1/1997 | Florin et al. |
| 5,598,524 A | 1/1997 | Johnston, Jr. et al. |
| 5,600,364 A | 2/1997 | Hendricks et al. |
| 5,600,573 A | 2/1997 | Hendricks et al. |
| 5,614,940 A | 3/1997 | Cobbley et al. |
| 5,619,247 A | 4/1997 | Russo |
| 5,619,249 A | 4/1997 | Billock et al. |
| 5,621,456 A | 4/1997 | Florin et al. |
| 5,623,613 A | 4/1997 | Rowe et al. |
| 5,625,405 A | 4/1997 | DuLac et al. |
| 5,625,864 A | 4/1997 | Budow et al. |
| 5,629,732 A | 5/1997 | Moskowitz et al. |
| 5,631,693 A | 5/1997 | Wunderlich et al. |
| 5,632,681 A | 5/1997 | Bakoglu et al. |
| 5,635,979 A | 6/1997 | Kostreski et al. |
| 5,635,980 A | 6/1997 | Lin et al. |
| 5,635,989 A | 6/1997 | Rothmuller |
| 5,650,831 A | 7/1997 | Farwell |
| 5,659,350 A | 8/1997 | Hendricks et al. |
| 5,664,133 A | 9/1997 | Malamud |
| 5,666,293 A | 9/1997 | Metz et al. |
| 5,671,411 A | 9/1997 | Watts et al. |
| 5,675,752 A | 10/1997 | Scott et al. |
| 5,682,206 A | 10/1997 | Wehmeyer et al. |
| 5,682,597 A | 10/1997 | Ganek et al. |
| 5,684,918 A | 11/1997 | Abecassis |
| 5,686,954 A | 11/1997 | Yoshinobu et al. |
| 5,687,331 A | 11/1997 | Volk et al. |
| 5,689,641 A | 11/1997 | Ludwig et al. |
| 5,694,176 A | 12/1997 | Bruette et al. |
| 5,694,546 A | 12/1997 | Reisman |
| 5,699,107 A | 12/1997 | Lawler et al. |
| 5,715,169 A | 2/1998 | Noguchi |
| 5,715,515 A | 2/1998 | Akins, III et al. |
| 5,721,827 A | 2/1998 | Logan et al. |
| 5,721,829 A | 2/1998 | Dunn et al. |
| 5,721,897 A | 2/1998 | Rubinstein |
| 5,724,106 A | 3/1998 | Autry et al. |
| 5,724,521 A | 3/1998 | Dedrick |
| 5,724,646 A | 3/1998 | Ganek et al. |
| 5,727,060 A | 3/1998 | Young |
| 5,729,549 A | 3/1998 | Kostreski et al. |
| 5,732,216 A | 3/1998 | Logan et al. |
| 5,734,853 A | 3/1998 | Hendricks et al. |
| 5,737,028 A | 4/1998 | Bertram et al. |
| 5,740,304 A | 4/1998 | Katsuyama et al. |
| 5,740,549 A | 4/1998 | Reilly et al. |
| 5,745,837 A | 4/1998 | Fuhrmann |
| 5,748,493 A | 5/1998 | Lightfoot et al. |
| 5,751,282 A | 5/1998 | Girard et al. |
| 5,752,160 A | 5/1998 | Dunn |
| 5,754,773 A | 5/1998 | Ozden et al. |
| 5,764,873 A | 6/1998 | Magid et al. |
| 5,764,899 A | 6/1998 | Eggleston et al. |
| 5,771,435 A | 6/1998 | Brown |
| 5,774,170 A | 6/1998 | Hite et al. |
| 5,778,077 A | 7/1998 | Davidson |
| 5,790,170 A | 8/1998 | Suzuki |
| 5,790,176 A | 8/1998 | Craig |
| 5,790,935 A | 8/1998 | Payton |
| 5,790,940 A | 8/1998 | Laborde et al. |
| 5,796,828 A | 8/1998 | Tsukamoto et al. |
| 5,798,785 A | 8/1998 | Hendricks et al. |
| 5,799,063 A | 8/1998 | Krane |
| 5,801,747 A | 9/1998 | Bedard |
| 5,801,787 A | 9/1998 | Schein et al. |
| 5,802,502 A | 9/1998 | Gell et al. |
| 5,808,608 A | 9/1998 | Young et al. |
| 5,808,611 A | 9/1998 | Johnson et al. |
| 5,809,204 A | 9/1998 | Young et al. ................... 386/83 |
| 5,812,123 A | 9/1998 | Rowe et al. |
| 5,812,124 A | 9/1998 | Eick et al. |
| 5,812,786 A | 9/1998 | Seazholtz et al. |
| 5,822,123 A | 10/1998 | Davis et al. |
| 5,826,110 A | 10/1998 | Ozden et al. |
| 5,828,419 A | 10/1998 | Bruette et al. |
| 5,828,845 A | 10/1998 | Jagadish et al. |
| 5,835,843 A | 11/1998 | Haddad |
| 5,838,314 A | 11/1998 | Neel et al. |
| 5,844,620 A | 12/1998 | Coleman et al. |
| 5,848,352 A | 12/1998 | Dougherty et al. |
| 5,850,218 A | 12/1998 | LaJoie et al. |
| 5,856,975 A | 1/1999 | Rostoker et al. |
| 5,859,641 A | 1/1999 | Cave |
| 5,861,906 A | 1/1999 | Dunn et al. |
| 5,877,756 A | 3/1999 | Um |
| 5,880,768 A | 3/1999 | Lemmons et al. |
| 5,886,690 A | 3/1999 | Pond et al. |
| 5,886,732 A | 3/1999 | Humpleman |
| 5,895,454 A | 4/1999 | Harrington |
| 5,898,456 A | 4/1999 | Wahl |
| 5,900,905 A | 5/1999 | Shoff et al. |
| 5,905,522 A | 5/1999 | Lawler |
| 5,905,942 A | 5/1999 | Stoel et al. |
| 5,907,323 A | 5/1999 | Lawler et al. |
| 5,913,040 A | 6/1999 | Rakavy et al. |
| 5,914,712 A | 6/1999 | Sartain et al. |
| 5,914,746 A | 6/1999 | Matthews, III et al. |
| 5,915,068 A | 6/1999 | Levine |
| 5,917,822 A | 6/1999 | Lyles et al. |
| 5,929,849 A | 7/1999 | Kikinis |
| 5,930,493 A | 7/1999 | Ottesen et al. |
| 5,935,206 A | 8/1999 | Dixon et al. |
| 5,936,659 A | 8/1999 | Viswanathan |
| 5,940,073 A | 8/1999 | Klosterman et al. |
| 5,943,047 A | 8/1999 | Suzuki |
| 5,956,024 A | 9/1999 | Strickland et al. |
| 5,956,716 A | 9/1999 | Kenner et al. |
| 5,960,411 A | 9/1999 | Hartman et al. |
| 5,961,603 A | 10/1999 | Kunkel et al. |
| 5,969,748 A | 10/1999 | Casement et al. |
| 5,978,043 A | 11/1999 | Blonstein et al. |
| 5,983,273 A | 11/1999 | White et al. |
| 5,986,650 A | 11/1999 | Ellis et al. |
| 5,987,256 A | 11/1999 | Wu et al. |
| 5,990,881 A | 11/1999 | Inoue et al. |
| 5,990,890 A | 11/1999 | Etheredge |
| 5,990,927 A | 11/1999 | Hendricks et al. |

| | | |
|---|---|---|
| 5,995,134 A | 11/1999 | Hayashi |
| 6,002,401 A | 12/1999 | Baker |
| 6,005,565 A | 12/1999 | Legall et al. |
| 6,005,631 A | 12/1999 | Anderson et al. |
| 6,006,257 A | 12/1999 | Slezak |
| 6,008,803 A | 12/1999 | Rowe et al. |
| 6,008,836 A | 12/1999 | Bruck et al. |
| 6,014,184 A | 1/2000 | Knee et al. |
| 6,014,694 A | 1/2000 | Aharoni et al. |
| 6,016,348 A | 1/2000 | Blatter et al. |
| 6,018,359 A | 1/2000 | Kermode |
| 6,018,372 A | 1/2000 | Etheredge |
| 6,020,912 A | 2/2000 | De Lang |
| 6,023,267 A | 2/2000 | Chapuis et al. |
| 6,025,837 A | 2/2000 | Matthews, III et al. |
| 6,025,868 A | 2/2000 | Russo |
| 6,025,869 A | 2/2000 | Stas et al. |
| 6,026,376 A | 2/2000 | Kenney |
| 6,035,281 A | 3/2000 | Crosskey et al. |
| 6,037,933 A | 3/2000 | Blonstein et al. |
| 6,049,831 A | 4/2000 | Gardell et al. |
| 6,057,872 A | 5/2000 | Candelore |
| 6,061,097 A | 5/2000 | Satterfield |
| 6,064,380 A | 5/2000 | Swenson et al. |
| 6,064,980 A | 5/2000 | Jacobi et al. |
| 6,070,186 A | 5/2000 | Nishio |
| 6,072,982 A | 6/2000 | Haddad |
| 6,073,105 A | 6/2000 | Sutcliffe et al. |
| 6,075,575 A * | 6/2000 | Schein et al. .................. 725/41 |
| 6,081,263 A | 6/2000 | LeGall et al. |
| 6,085,185 A | 7/2000 | Matsuzawa et al. |
| 6,094,680 A | 7/2000 | Hokanson |
| 6,097,383 A | 8/2000 | Gaughan et al. |
| 6,098,082 A | 8/2000 | Gibbon et al. |
| 6,101,512 A | 8/2000 | DeRose et al. |
| 6,108,002 A | 8/2000 | Ishizaki |
| 6,108,042 A | 8/2000 | Adams et al. |
| 6,118,445 A | 9/2000 | Nonomura et al. |
| 6,118,976 A | 9/2000 | Arias et al. |
| 6,124,878 A | 9/2000 | Adams et al. |
| 6,125,259 A | 9/2000 | Perlman |
| 6,133,909 A | 10/2000 | Schein et al. |
| 6,137,539 A | 10/2000 | Lownes et al. |
| 6,138,139 A | 10/2000 | Beck et al. |
| 6,141,003 A | 10/2000 | Chor et al. |
| 6,141,488 A | 10/2000 | Knudson et al. |
| 6,145,083 A | 11/2000 | Shaffer et al. |
| 6,148,332 A | 11/2000 | Brewer et al. |
| 6,151,059 A | 11/2000 | Schein et al. |
| 6,157,377 A | 12/2000 | Shah-Nazaroff et al. |
| 6,157,413 A | 12/2000 | Hanafee et al. |
| 6,160,546 A | 12/2000 | Thompson et al. |
| 6,160,989 A | 12/2000 | Hendricks et al. |
| 6,163,272 A | 12/2000 | Goode et al. |
| 6,166,730 A | 12/2000 | Goode et al. |
| 6,169,543 B1 | 1/2001 | Wehmeyer |
| 6,172,674 B1 | 1/2001 | Etheredge |
| 6,172,677 B1 | 1/2001 | Stautner et al. |
| 6,177,931 B1 | 1/2001 | Alexander et al. |
| 6,181,333 B1 | 1/2001 | Chaney et al. |
| 6,181,693 B1 | 1/2001 | Maresca |
| 6,182,287 B1 | 1/2001 | Schneidewend et al. |
| 6,184,877 B1 | 2/2001 | Dodson et al. |
| 6,188,684 B1 | 2/2001 | Setoyama et al. |
| 6,195,689 B1 | 2/2001 | Bahlmann |
| 6,201,540 B1 | 3/2001 | Gallup et al. |
| 6,205,485 B1 | 3/2001 | Kikinis |
| 6,208,335 B1 | 3/2001 | Gordon et al. |
| 6,209,130 B1 | 3/2001 | Rector et al. |
| 6,216,264 B1 | 4/2001 | Maze et al. |
| 6,238,290 B1 | 5/2001 | Tarr et al. |
| 6,239,845 B1 | 5/2001 | Itagaki et al. |
| 6,240,555 B1 | 5/2001 | Shoff et al. |
| 6,243,142 B1 | 6/2001 | Mugura et al. |
| 6,249,532 B1 | 6/2001 | Yoshikawa et al. |
| 6,253,375 B1 | 6/2001 | Gordon et al. |
| 6,259,733 B1 | 7/2001 | Kaye et al. |
| 6,266,814 B1 | 7/2001 | Lemmons et al. |
| 6,268,849 B1 | 7/2001 | Boyer et al. |
| 6,272,484 B1 | 8/2001 | Martin et al. |
| 6,275,268 B1 | 8/2001 | Ellis et al. |
| 6,282,713 B1 | 8/2001 | Kitsukawa et al. |
| 6,289,346 B1 | 9/2001 | Milewski et al. |
| 6,289,514 B1 | 9/2001 | Link et al. |
| 6,292,624 B1 | 9/2001 | Saib et al. |
| 6,305,019 B1 | 10/2001 | Dyer et al. |
| 6,311,011 B1 | 10/2001 | Kuroda |
| 6,314,572 B1 | 11/2001 | LaRocca et al. |
| 6,314,573 B1 | 11/2001 | Gordon et al. |
| 6,314,575 B1 | 11/2001 | Billock et al. |
| 6,317,777 B1 | 11/2001 | Skarbo et al. |
| 6,317,885 B1 | 11/2001 | Fries |
| 6,323,911 B1 | 11/2001 | Schein et al. |
| 6,327,628 B1 | 12/2001 | Anuff et al. |
| 6,335,936 B1 | 1/2002 | Bossemeyer, Jr. et al. |
| 6,347,400 B1 | 2/2002 | Ohkura et al. |
| 6,349,410 B1 | 2/2002 | Lortz |
| 6,353,448 B1 | 3/2002 | Scarborough et al. |
| 6,357,046 B1 | 3/2002 | Thompson et al. |
| 6,359,636 B1 | 3/2002 | Schindler et al. |
| 6,360,367 B1 | 3/2002 | Yamamoto |
| 6,362,841 B1 | 3/2002 | Nykanen |
| 6,367,078 B1 | 4/2002 | Lasky |
| 6,378,130 B1 | 4/2002 | Adams |
| 6,381,332 B1 | 4/2002 | Glaab |
| 6,385,614 B1 | 5/2002 | Vellandi |
| 6,393,585 B1 | 5/2002 | Houha et al. |
| 6,396,549 B1 | 5/2002 | Weber |
| 6,400,280 B1 | 6/2002 | Osakabe |
| 6,401,243 B1 | 6/2002 | Suzuki |
| 6,405,239 B1 | 6/2002 | Addington et al. |
| 6,421,067 B1 | 7/2002 | Kamen et al. |
| 6,429,899 B1 | 8/2002 | Nio et al. |
| 6,434,748 B1 | 8/2002 | Shen et al. |
| 6,441,862 B1 | 8/2002 | Yuen et al. |
| 6,442,332 B1 | 8/2002 | Knudson et al. |
| 6,442,755 B1 | 8/2002 | Lemmons et al. |
| 6,442,756 B1 | 8/2002 | Durden et al. |
| 6,446,261 B1 | 9/2002 | Rosser |
| 6,446,262 B1 | 9/2002 | Malaure et al. |
| 6,460,181 B1 | 10/2002 | Donnelly |
| 6,463,585 B1 | 10/2002 | Hendricks et al. |
| 6,476,833 B1 | 11/2002 | Moshfeghi |
| 6,480,669 B1 | 11/2002 | Tsumagari et al. |
| 6,481,010 B2 | 11/2002 | Nishikawa et al. |
| 6,481,011 B1 | 11/2002 | Lemmons |
| 6,486,920 B2 | 11/2002 | Arai et al. |
| 6,501,902 B1 | 12/2002 | Wang |
| 6,505,348 B1 | 1/2003 | Knowles et al. |
| 6,507,949 B1 | 1/2003 | Jonason et al. |
| 6,510,556 B1 | 1/2003 | Kusaba et al. |
| 6,515,680 B1 | 2/2003 | Hendricks et al. |
| 6,515,710 B1 | 2/2003 | Koshimuta |
| 6,519,770 B2 | 2/2003 | Ford |
| 6,526,575 B1 * | 2/2003 | McCoy et al. ................. 725/114 |
| 6,526,577 B1 | 2/2003 | Knudson et al. |
| 6,532,589 B1 | 3/2003 | Proehl et al. |
| 6,536,041 B1 | 3/2003 | Knudson et al. |
| 6,539,548 B1 | 3/2003 | Hendricks et al. |
| 6,543,053 B1 | 4/2003 | Li et al. |
| 6,545,669 B1 | 4/2003 | Kinawi et al. |
| 6,557,030 B1 | 4/2003 | Hoang |
| 6,563,515 B1 | 5/2003 | Reynolds et al. |
| 6,564,378 B1 | 5/2003 | Satterfield et al. |
| 6,564,379 B1 | 5/2003 | Knudson et al. |
| 6,564,383 B1 | 5/2003 | Combs et al. |
| 6,571,390 B1 | 5/2003 | Dunn et al. |
| 6,574,793 B1 | 6/2003 | Ngo et al. |
| 6,578,077 B1 | 6/2003 | Rakoshitz et al. |
| 6,594,699 B1 | 7/2003 | Sahai et al. |
| 6,594,825 B1 | 7/2003 | Goldschmidt Iki et al. |
| 6,600,496 B1 | 7/2003 | Wagner et al. |
| 6,604,240 B2 | 8/2003 | Ellis et al. |
| 6,609,253 B1 | 8/2003 | Swix et al. |
| 6,611,958 B1 | 8/2003 | Shintani et al. |
| 6,614,440 B1 | 9/2003 | Bowen et al. |
| 6,614,988 B1 | 9/2003 | Sampsell |
| 6,628,302 B2 | 9/2003 | White et al. |

| Patent No. | Date | Inventor(s) |
|---|---|---|
| 6,631,413 B1 | 10/2003 | Aggarwal et al. |
| 6,642,939 B1 | 11/2003 | Vallone et al. |
| 6,647,548 B1 | 11/2003 | Lu et al. |
| 6,651,044 B1 | 11/2003 | Stoneman |
| 6,662,365 B1 | 12/2003 | Sullivan et al. |
| 6,665,869 B1 | 12/2003 | Ellis et al. |
| 6,671,328 B1 | 12/2003 | Poon et al. |
| 6,675,384 B1 | 1/2004 | Block et al. |
| 6,675,385 B1 | 1/2004 | Wang |
| 6,678,891 B1 | 1/2004 | Wilcox et al. |
| 6,681,395 B1 | 1/2004 | Nishi |
| 6,681,396 B1 | 1/2004 | Bates et al. |
| 6,684,025 B1 | 1/2004 | Perlman |
| 6,684,400 B1 | 1/2004 | Goode et al. |
| 6,697,376 B1 | 2/2004 | Son et al. |
| 6,698,023 B2 | 2/2004 | Levitan |
| 6,701,523 B1 | 3/2004 | Hancock et al. |
| 6,701,528 B1 | 3/2004 | Arsenault et al. |
| 6,706,311 B2 | 3/2004 | Wong et al. |
| 6,708,336 B1 | 3/2004 | Bruette |
| 6,717,590 B1 | 4/2004 | Sullivan |
| 6,718,552 B1 | 4/2004 | Goode |
| 6,725,461 B1 | 4/2004 | Dougherty et al. |
| 6,731,310 B2 | 5/2004 | Craycroft et al. |
| 6,732,367 B1 | 5/2004 | Ellis et al. |
| 6,732,369 B1 | 5/2004 | Schein et al. |
| 6,732,372 B2 | 5/2004 | Tomita et al. |
| 6,735,572 B2 | 5/2004 | Landesmann |
| 6,738,982 B1 | 5/2004 | Jerding |
| 6,757,909 B1 | 6/2004 | Maruo et al. |
| 6,760,918 B2 | 7/2004 | Rodriguez et al. |
| 6,769,127 B1 | 7/2004 | Bonomi et al. |
| 6,771,290 B1 | 8/2004 | Hoyle |
| 6,772,209 B1 | 8/2004 | Chernock et al. |
| 6,772,433 B1 | 8/2004 | LaJoie et al. |
| 6,782,550 B1 | 8/2004 | Cao |
| 6,791,620 B1 | 9/2004 | Elswick et al. |
| 6,792,615 B1 | 9/2004 | Rowe et al. |
| 6,801,533 B1 | 10/2004 | Barkley |
| 6,817,028 B1 | 11/2004 | Jerding et al. |
| 6,832,386 B1 | 12/2004 | Jerding et al. |
| 6,847,969 B1 | 1/2005 | Mathai et al. |
| 6,876,628 B2 | 4/2005 | Howard et al. |
| 6,898,762 B2 | 5/2005 | Ellis et al. |
| 6,901,385 B2 | 5/2005 | Okamoto et al. |
| 6,957,386 B2 | 10/2005 | Nishina et al. |
| 6,968,372 B1 | 11/2005 | Thompson et al. |
| 6,978,310 B1 * | 12/2005 | Rodriguez et al. ............ 709/231 |
| 6,978,475 B1 | 12/2005 | Kunin et al. |
| 6,986,156 B1 | 1/2006 | Rodriguez et al. |
| 6,990,676 B1 | 1/2006 | Proehl et al. |
| 6,990,677 B1 | 1/2006 | Pietraszak et al. |
| 6,993,782 B1 | 1/2006 | Newberry et al. |
| 7,010,801 B1 | 3/2006 | Jerding et al. |
| 7,024,681 B1 | 4/2006 | Fransman et al. |
| 7,039,944 B1 | 5/2006 | Cho et al. |
| 7,062,466 B2 | 6/2006 | Wagner et al. |
| 7,076,734 B2 | 7/2006 | Wolff et al. |
| 7,086,077 B2 | 8/2006 | Giammaressi |
| 7,103,903 B1 | 9/2006 | Kydd |
| 7,110,714 B1 | 9/2006 | Kay et al. |
| 7,117,440 B2 | 10/2006 | Gordon et al. |
| 7,120,926 B1 | 10/2006 | Safadi et al. |
| 7,143,430 B1 | 11/2006 | Fingerman et al. |
| 7,150,031 B1 | 12/2006 | Rodriguez et al. |
| 7,155,733 B2 | 12/2006 | Rodriguez et al. |
| 7,180,422 B2 | 2/2007 | Milenkovic et al. |
| 7,185,355 B1 | 2/2007 | Ellis et al. |
| 7,188,356 B1 | 3/2007 | Miura et al. |
| 7,194,757 B1 | 3/2007 | Fish et al. |
| 7,200,857 B1 | 4/2007 | Rodriguez et al. |
| 7,237,251 B1 | 6/2007 | Oz et al. |
| 7,243,364 B2 | 7/2007 | Dunn et al. |
| 7,249,366 B1 | 7/2007 | Flavin |
| 7,324,552 B1 | 1/2008 | Galand et al. |
| 7,324,553 B1 | 1/2008 | Varier et al. |
| 7,334,251 B2 | 2/2008 | Rodriguez et al. |
| 7,340,759 B1 | 3/2008 | Rodriguez |
| 7,343,614 B1 | 3/2008 | Hendricks et al. |
| 7,356,477 B1 | 4/2008 | Allan et al. |
| 7,404,200 B1 | 7/2008 | Hailey et al. |
| 7,496,943 B1 | 2/2009 | Goldberg et al. |
| 7,496,945 B2 | 2/2009 | Rodriguez |
| 7,509,267 B1 | 3/2009 | Yarmolich et al. |
| 7,512,964 B2 | 3/2009 | Rodriguez et al. |
| 7,526,788 B2 | 4/2009 | Rodriguez |
| 7,647,549 B2 | 1/2010 | Denoual et al. |
| 7,673,314 B2 | 3/2010 | Ellis et al. |
| 7,685,520 B2 | 3/2010 | Rashkovskiy et al. |
| 7,707,614 B2 | 4/2010 | Krikorian et al. |
| 7,934,232 B1 | 4/2011 | Jerding et al. |
| 7,961,643 B2 | 6/2011 | McDonald et al. |
| 7,962,370 B2 | 6/2011 | Rodriguez et al. |
| 2001/0003846 A1 | 6/2001 | Rowe et al. |
| 2001/0013125 A1 | 8/2001 | Kitsukawa et al. |
| 2001/0013127 A1 | 8/2001 | Tomita et al. |
| 2001/0029523 A1 | 10/2001 | Mcternan et al. |
| 2001/0030667 A1 | 10/2001 | Kelts |
| 2001/0032335 A1 | 10/2001 | Jones |
| 2001/0034763 A1 | 10/2001 | Jacobs et al. |
| 2001/0036271 A1 | 11/2001 | Javed |
| 2001/0044744 A1 | 11/2001 | Rhoads |
| 2002/0002642 A1 | 1/2002 | Tyson et al. |
| 2002/0007485 A1 | 1/2002 | Rodriguez et al. |
| 2002/0013836 A1 | 1/2002 | Friedman et al. |
| 2002/0026496 A1 | 2/2002 | Boyer et al. |
| 2002/0026638 A1 | 2/2002 | Eldering et al. |
| 2002/0032638 A1 | 3/2002 | Arora et al. |
| 2002/0032728 A1 | 3/2002 | Sako et al. |
| 2002/0032905 A1 | 3/2002 | Sherr et al. |
| 2002/0042913 A1 | 4/2002 | Ellis et al. |
| 2002/0044762 A1 | 4/2002 | Wood et al. |
| 2002/0049804 A1 | 4/2002 | Rodriguez et al. |
| 2002/0049978 A1 | 4/2002 | Rodriguez et al. |
| 2002/0056098 A1 | 5/2002 | White |
| 2002/0056118 A1 | 5/2002 | Hunter et al. |
| 2002/0057336 A1 | 5/2002 | Gaul et al. |
| 2002/0062481 A1 | 5/2002 | Slaney et al. |
| 2002/0069105 A1 | 6/2002 | do Rosario Botelho |
| 2002/0069218 A1 | 6/2002 | Sull et al. |
| 2002/0069412 A1 | 6/2002 | Philips |
| 2002/0078176 A1 | 6/2002 | Nomura et al. |
| 2002/0083443 A1 | 6/2002 | Eldering et al. |
| 2002/0087981 A1 | 7/2002 | Daniels |
| 2002/0101367 A1 | 8/2002 | Geiger et al. |
| 2002/0104083 A1 | 8/2002 | Hendricks et al. |
| 2002/0108125 A1 | 8/2002 | Joao |
| 2002/0124249 A1 | 9/2002 | Shintani et al. |
| 2002/0128908 A1 | 9/2002 | Levin et al. |
| 2002/0129362 A1 | 9/2002 | Chang et al. |
| 2003/0002862 A1 | 1/2003 | Rodriguez et al. |
| 2003/0014753 A1 | 1/2003 | Beach et al. |
| 2003/0030679 A1 | 2/2003 | Jain |
| 2003/0031465 A1 | 2/2003 | Blake |
| 2003/0037068 A1 | 2/2003 | Thomas et al. |
| 2003/0037332 A1 | 2/2003 | Chapin et al. |
| 2003/0061619 A1 | 3/2003 | Giammaressi |
| 2003/0067554 A1 | 4/2003 | Klarfeld et al. |
| 2003/0074214 A1 | 4/2003 | Kelliher |
| 2003/0074257 A1 | 4/2003 | Saveliev et al. |
| 2003/0079227 A1 | 4/2003 | Knowles et al. |
| 2003/0088872 A1 | 5/2003 | Maissel et al. |
| 2003/0101451 A1 | 5/2003 | Bentolila et al. |
| 2003/0101454 A1 | 5/2003 | Ozer et al. |
| 2003/0124973 A1 | 7/2003 | Sie et al. |
| 2003/0126425 A1 | 7/2003 | Yang et al. |
| 2003/0131356 A1 | 7/2003 | Proehl et al. |
| 2003/0135853 A1 | 7/2003 | Goldman et al. |
| 2003/0154475 A1 | 8/2003 | Rodriguez et al. |
| 2003/0154486 A1 | 8/2003 | Dunn et al. |
| 2003/0159147 A1 | 8/2003 | Young et al. |
| 2003/0174243 A1 | 9/2003 | Arbeiter et al. |
| 2003/0188313 A1 | 10/2003 | Ellis et al. |
| 2003/0193486 A1 | 10/2003 | Estrop |
| 2003/0206553 A1 | 11/2003 | Surcouf et al. |
| 2003/0219228 A1 | 11/2003 | Thiagarajan et al. |
| 2003/0221194 A1 | 11/2003 | Thiagarajan et al. |
| 2004/0034867 A1 | 2/2004 | Rashkovskiy et al. |

| | | |
|---|---|---|
| 2004/0049787 A1 | 3/2004 | Maissel et al. |
| 2004/0107436 A1 | 6/2004 | Ishizaki |
| 2004/0117831 A1 | 6/2004 | Ellis et al. |
| 2004/0128685 A1 | 7/2004 | Hassell et al. |
| 2004/0133907 A1 | 7/2004 | Rodriguez et al. |
| 2004/0163117 A1 | 8/2004 | Rodriguez et al. |
| 2004/0168191 A1 | 8/2004 | Jerding et al. |
| 2004/0181801 A1 | 9/2004 | Hagen et al. |
| 2004/0221310 A1 | 11/2004 | Herrington et al. |
| 2004/0261112 A1 | 12/2004 | Hicks et al. |
| 2004/0261125 A1 | 12/2004 | Ellis et al. |
| 2005/0008074 A1 | 1/2005 | van Beek et al. |
| 2005/0028190 A1 | 2/2005 | Rodriguez et al. |
| 2005/0044565 A1 | 2/2005 | Jerding et al. |
| 2005/0044566 A1 | 2/2005 | Jerding et al. |
| 2005/0044577 A1 | 2/2005 | Jerding et al. |
| 2005/0071882 A1 | 3/2005 | Rodriguez et al. |
| 2005/0076360 A1 | 4/2005 | Jerding et al. |
| 2005/0091693 A1 | 4/2005 | Amine et al. |
| 2005/0111046 A1 | 5/2005 | Kurumisawa et al. |
| 2005/0138657 A1 | 6/2005 | Leftwich |
| 2005/0155056 A1 | 7/2005 | Knee et al. |
| 2005/0160468 A1 | 7/2005 | Rodriguez et al. |
| 2005/0188415 A1 | 8/2005 | Riley |
| 2005/0204387 A1 | 9/2005 | Knudson et al. |
| 2005/0204388 A1 | 9/2005 | Knudson et al. |
| 2005/0213506 A1 | 9/2005 | Wakumoto et al. |
| 2005/0216936 A1 | 9/2005 | Knudson et al. |
| 2005/0240961 A1 | 10/2005 | Jerding et al. |
| 2005/0251822 A1 | 11/2005 | Knowles et al. |
| 2005/0278741 A1 | 12/2005 | Robarts et al. |
| 2005/0283797 A1 | 12/2005 | Eldering et al. |
| 2005/0283810 A1 | 12/2005 | Ellis et al. |
| 2005/0289618 A1 | 12/2005 | Hardin |
| 2006/0020982 A1 | 1/2006 | Jerding et al. |
| 2006/0026080 A1 | 2/2006 | Rodriguez et al. |
| 2006/0059525 A1 | 3/2006 | Jerding et al. |
| 2006/0070107 A1 | 3/2006 | Renkis |
| 2006/0088105 A1 | 4/2006 | Shen et al. |
| 2006/0112434 A1 | 5/2006 | Banker et al. |
| 2006/0206913 A1 | 9/2006 | Jerding et al. |
| 2006/0271933 A1 | 11/2006 | Agassi et al. |
| 2006/0271964 A1 | 11/2006 | Rodriguez et al. |
| 2006/0271973 A1 | 11/2006 | Jerding et al. |
| 2007/0019670 A1 | 1/2007 | Falardeau |
| 2007/0053293 A1 | 3/2007 | McDonald et al. |
| 2007/0094690 A1 | 4/2007 | Rodriguez et al. |
| 2007/0136748 A1 | 6/2007 | Rodriguez et al. |
| 2007/0186240 A1 | 8/2007 | Ward, III et al. |
| 2008/0010658 A1 | 1/2008 | Abbott et al. |
| 2008/0098421 A1 | 4/2008 | Rodriguez et al. |
| 2008/0098422 A1 | 4/2008 | Rodriguez et al. |
| 2008/0101460 A1 | 5/2008 | Rodriguez |
| 2008/0104637 A1 | 5/2008 | Rodriguez et al. |
| 2008/0137755 A1 | 6/2008 | Onur et al. |
| 2008/0155631 A1 | 6/2008 | Liwerant et al. |
| 2008/0229361 A1 | 9/2008 | Jerding et al. |
| 2008/0279217 A1 | 11/2008 | McDonald et al. |
| 2008/0281968 A1 | 11/2008 | Rodriguez |
| 2008/0282307 A1 | 11/2008 | McDonald et al. |
| 2008/0282308 A1 | 11/2008 | McDonald et al. |
| 2009/0141794 A1 | 6/2009 | Rodriguez et al. |
| 2009/0150958 A1 | 6/2009 | Jerding et al. |
| 2009/0158306 A1 | 6/2009 | Rodriguez et al. |
| 2009/0158324 A1 | 6/2009 | Rodriguez et al. |
| 2009/0158329 A1 | 6/2009 | Rodriguez et al. |
| 2009/0158331 A1 | 6/2009 | Rodriguez et al. |
| 2009/0158332 A1 | 6/2009 | Rodriguez et al. |
| 2009/0158335 A1 | 6/2009 | Rodriguez et al. |
| 2009/0158339 A1 | 6/2009 | Rodriguez et al. |
| 2009/0158352 A1 | 6/2009 | Rodriguez et al. |
| 2009/0158354 A1 | 6/2009 | Rodriguez et al. |
| 2009/0158355 A1 | 6/2009 | Rodriguez et al. |
| 2009/0158363 A1 | 6/2009 | Rodriguez et al. |
| 2009/0183081 A1 | 7/2009 | Rodriguez et al. |
| 2009/0190028 A1 | 7/2009 | Rodriguez et al. |
| 2009/0193468 A1 | 7/2009 | Rodriguez |
| 2009/0193471 A1 | 7/2009 | Rodriguez |
| 2009/0276808 A1 | 11/2009 | Jerding et al. |
| 2009/0282372 A1 | 11/2009 | Jerding et al. |
| 2009/0282440 A1 | 11/2009 | Rodriguez |
| 2010/0242063 A1 | 9/2010 | Slaney et al. |

FOREIGN PATENT DOCUMENTS

| | | |
|---|---|---|
| CA | 2 223 025 C | 11/2001 |
| CA | 2 475 723 | 1/2011 |
| EP | 0 572 090 A2 | 12/1993 |
| EP | 0 673 159 A1 | 9/1995 |
| EP | 0 680 214 A2 | 11/1995 |
| EP | 0 725 538 A2 | 8/1996 |
| EP | 0 763 936 A2 | 3/1997 |
| EP | 0 811 939 A2 | 12/1997 |
| EP | 0 838 915 A2 | 4/1998 |
| EP | 0 849 948 A2 | 6/1998 |
| EP | 0 854 645 A2 | 7/1998 |
| EP | 0 891 084 A2 | 1/1999 |
| EP | 0 896 318 A2 | 2/1999 |
| EP | 0 909 095 A1 | 4/1999 |
| EP | 0 701 756 B1 | 12/1999 |
| EP | 0 989 751 A2 | 3/2000 |
| EP | 1 069 801 A1 | 1/2001 |
| EP | 1 075 143 A1 | 2/2001 |
| EP | 1 111 572 A2 | 6/2001 |
| EP | 1 161 085 A1 | 12/2001 |
| GB | 2 343 051 A | 4/2000 |
| JP | 8-289219 | 11/1996 |
| JP | 9-322022 | 12/1997 |
| JP | 10-143734 | 5/1998 |
| JP | 11-73361 | 3/1999 |
| JP | 11-073394 | 3/1999 |
| JP | 11-164284 | 6/1999 |
| JP | 2000-101941 | 4/2000 |
| WO | WO 92/22983 | 12/1992 |
| WO | WO 94/14284 | 6/1994 |
| WO | WO 96/17467 | 6/1996 |
| WO | WO 96/33579 | 10/1996 |
| WO | WO 96/34486 | 10/1996 |
| WO | WO 96/34491 | 10/1996 |
| WO | WO 96/41477 | 12/1996 |
| WO | WO 96/41478 | 12/1996 |
| WO | WO 97/34414 | 9/1997 |
| WO | WO 98/03012 | 1/1998 |
| WO | WO 98/26528 | 6/1998 |
| WO | WO 98/31116 | 7/1998 |
| WO | WO 98/37695 | 8/1998 |
| WO | WO 98/39893 | 9/1998 |
| WO | WO 98/47279 | 10/1998 |
| WO | WO 98/48566 | 10/1998 |
| WO | WO 98/56172 | 12/1998 |
| WO | WO 98/56173 | 12/1998 |
| WO | WO 98/56188 | 12/1998 |
| WO | WO 99/01984 | 1/1999 |
| WO | WO 99/04560 | 1/1999 |
| WO | WO 99/04561 | 1/1999 |
| WO | WO 99/12109 | 3/1999 |
| WO | WO 99/14947 | 3/1999 |
| WO | WO 99/35831 | 7/1999 |
| WO | WO 99/45701 | 9/1999 |
| WO | WO 99/49717 | 10/1999 |
| WO | WO 99/52285 | 10/1999 |
| WO | WO 99/57903 | 11/1999 |
| WO | WO 99/59903 | 11/1999 |
| WO | WO 99/60790 | 11/1999 |
| WO | WO 99/66719 | 12/1999 |
| WO | WO 00/02385 | 1/2000 |
| WO | WO 00/04726 | 1/2000 |
| WO | WO 00/05889 | 2/2000 |
| WO | WO 00/30354 | 5/2000 |
| WO | WO 00/40017 | 7/2000 |
| WO | WO 00/46988 | 8/2000 |
| WO | WO 00/49801 | 8/2000 |
| WO | WO 00/59202 | 10/2000 |
| WO | WO 00/60482 | 10/2000 |
| WO | WO 00/78031 A2 | 12/2000 |
| WO | WO 00/78045 A1 | 12/2000 |
| WO | WO 00/78047 A1 | 12/2000 |
| WO | WO 00/78048 A1 | 12/2000 |
| WO | WO 01/06788 A1 | 1/2001 |

| | | |
|---|---|---|
| WO | WO 01/20907 A1 | 3/2001 |
| WO | WO 01/24067 A1 | 4/2001 |
| WO | WO 01/56273 A1 | 8/2001 |
| WO | WO 01/67736 A2 | 9/2001 |
| WO | WO 01/72042 A1 | 9/2001 |
| WO | WO 01/76245 A2 | 10/2001 |
| WO | WO 01/77888 A2 | 10/2001 |
| WO | WO 01/84831 A2 | 11/2001 |
| WO | WO 02/097584 A2 | 12/2002 |
| WO | WO 03/003164 A2 | 1/2003 |
| WO | WO 03/003709 A2 | 1/2003 |
| WO | WO 03/014873 A2 | 2/2003 |
| WO | WO 03/024084 A2 | 3/2003 |
| WO | WO 03/042787 A2 | 5/2003 |
| WO | WO 03/069898 A1 | 8/2003 |
| WO | WO 2004/091219 A1 | 10/2004 |
| WO | WO 2004/100500 A2 | 11/2004 |
| WO | WO 2005/059202 A1 | 6/2005 |
| WO | WO 2005/071658 A1 | 8/2005 |
| WO | WO 2007/030370 A1 | 3/2007 |

OTHER PUBLICATIONS

"Client User Interface Specification (Phase I) for Video-On-Demand Application Development on the Explorer 2000™ Digital Home Communications Terminal", Revision 1.10 (Aug. 31, 1998).

"Evidence of illustrative movie release years," Retrieved from the Internet Movie Database using Internet, http://www.imdb.com, 19 pages (Retrieved on Jun. 6, 2005).

"ISO/IEC 13818-6 Information technology—Generic coding of moving pictures and associated audio information—Part 6: Extensions for DSM-CC," Chapter 4, 113 pages (Sep. 1, 1998).

"Netcaster Developer's Guide," Devedge Online Documentation, Netscape Communications Corporation, http://developer.netscape.com/docs/manuals/netcast/devguide/ index.html, XP-002166370, 82 pages (Sep. 25, 1997).

"Netscape Navigator Help," Netscape Navigator Software User Documentation, Netscape Communications Corporation, http://home.netscape.com, XP-002166369, pp. 1-63 (Aug. 10, 1997).

"Sez You . . . origin of word daemon," *Take Our Word For It*, Issue 146, p. 4, http://www.takeourword.com/TOW146/page4.html (retrieved on Apr. 4, 2006).

Addington, Timothy H., "System Architecture Specification for Video-On-Demand Application Development on the Explorer 2000™ Digital Home Communications Terminal", Revision 1.10r Review Copy (Mar. 4, 1999).

ATI Multimedia Center 7.9, User's Guide, ATI Technologies Inc., pp. i-vi and 1-96 (Copyright 2002).

Barth et al., "10 Fernsehen am PC", Suse GMBH, XP-002324319, pp. 143-149 (2001).

BPAI Decision for U.S. Appl. No. 09/692,995, mailed Aug. 20, 2008.

BPAI Decision for U.S. Appl. No. 09/693,288, mailed Nov. 28, 2007.

Canadian Office Action cited in Application No. 2,376,556 mailed Sep. 30, 2008.

Canadian Office Action cited in Application No. 2,376,556 mailed Nov. 23, 2007.

Canadian Office Action cited in Application No. 2,376,556 mailed Dec. 6, 2005.

Canadian Office Action cited in Application No. 2,402,088 mailed May 30, 2006.

Canadian Office Action cited in Application No. 2,405,491 mailed Apr. 3, 2009.

Canadian Office Action cited in Application No. 2,405,491 mailed May 22, 2008.

Canadian Office Action cited in Application No. 2,405,491 mailed Jun. 20, 2007.

Canadian Office Action cited in Application No. 2,405,491 mailed Jan. 20, 2006.

Canadian Office Action cited in Application No. 2,408,289 mailed Aug. 27, 2008.

Canadian Office Action cited in Application No. 2,408,289 mailed May 30, 2006.

Canadian Office Action cited in Application No. 2,451,477 mailed Nov. 3, 2009.

Canadian Office Action cited in Application No. 2,456,318 mailed May 5, 2008.

Canadian Office Action cited in Application No. 2,456,318 mailed Mar. 27, 2007.

Canadian Office Action cited in Application No. 2,459,334 mailed Apr. 16, 2009.

Canadian Office Action cited in Application No. 2,466,667 mailed Apr. 15, 2009.

Canadian Office Action cited in Application No. 2,475,723 mailed Jul. 7, 2009.

Canadian Office Action cited in Application No. 2,621,605 mailed Dec. 15, 2009.

Cunningham et al., "5 Das X Window System"., Suse GMBH, XP-002324320, pp. 129-180 (2001).

Decision on Appeal affirmed cited in U.S. Appl. No. 09/590,434 mailed May 28, 2008.

Definition of "flag", *Microsoft Press: Computer User's Dictionary*, 3 pages (1998).

Definition of "renting", Webster's II: New College Dictionary, 1995, Houghton Mifflin Company, p. 939.

European Examination Report cited in Application No. 00 938 251.6 mailed Nov. 2, 2007.

European Examination Report cited in Application No. 00 939 759.7 mailed May 10, 2007.

European Examination Report cited in Application No. 01 905 058.2 mailed Dec. 19, 2006.

European Examination Report cited in Application No. 01 922 261.1 mailed Jul. 18, 2008.

European Examination Report cited in Application No. 01 922 261.1 mailed Nov. 2, 2007.

European Examination Report cited in Application No. 01 922 261.1 mailed Jan. 24, 2007.

European Examination Report cited in Application No. 01 922 261.1 mailed May 26, 2006.

European Examination Report cited in Application No. 01 923 092.9 mailed Jul. 20, 2009.

European Examination Report cited in Application No. 01 923 092.9 mailed Nov. 27, 2008.

European Examination Report cited in Application No. 01 937 209.3 mailed Jun. 23, 2008.

European Examination Report cited in Application No. 02 737 593.0 mailed May 6, 2009.

European Examination Report cited in Application No. 02 750 416.6 mailed Aug. 4, 2008.

European Examination Report cited in Application No. 02 750 416.6 mailed Aug. 28, 2007.

European Examination Report cited in Application No. 02 761 572.3 mailed Apr. 20, 2009.

European Examination Report cited in Application No. 02 761 572.3 mailed Sep. 22, 2008.

European Examination Report cited in Application No. 02 761 572.3 mailed Jan. 22, 2008.

European Examination Report cited in Application No. 02 761 572.3 mailed Aug. 29, 2007.

European Examination Report cited in Application No. 06 802 683.0 mailed Jun. 26, 2008.

Examiner's Answer to Appeal Brief cited in U.S. Appl. No. 09/590,488 mailed Jan. 11, 2008.

Japanese Office Action cited in Application No. 2001-581527 mailed Sep. 8, 2009.

Kevin, "Change Screen Resolution in Windows (Tips, Tricks, Tweaks, and Setting)," http://www.tacktech.com/display.cfm?t-tid=207, pp. 1-3 (Oct. 26, 2002).

Leftwitch et al., "StarSight Interactive Television Program Guide—Functional/Interational Architecture Specification Document, Interaction Analysis and Design Project—Phase III," 36 pages.

McFedries, "The Complete Idiot's Guide to Windows 95," Que, 2nd Edition, p. 49 (1997).

PCT Search Report cited in International Application No. PCT/US00/15952 mailed Jan. 16, 2001.

PCT Search Report cited in International Application No. PCT/US00/15963 mailed Sep. 1, 2000.

PCT Search Report cited in International Application No. PCT/US00/16000 mailed Oct. 2, 2000.
PCT Search Report cited in International Application No. PCT/US01/02490 mailed May 18, 2001.
PCT Search Report cited in International Application No. PCT/US01/06663 mailed Oct. 18, 2001.
PCT Search Report cited in International Application No. PCT/US01/10874 mailed Nov. 29, 2001.
PCT Search Report cited in International Application No. PCT/US01/14150 mailed Apr. 29, 2002.
PCT Search Report cited in International Application No. PCT/US02/20307 mailed Jan. 3, 2003.
PCT Search Report cited in International Application No. PCT/US02/20519 mailed Apr. 7, 2003.
PCT Search Report cited in International Application No. PCT/US02/24704 mailed Mar. 5, 2003.
PCT Search Report cited in International Application No. PCT/US02/28212 mailed Jan. 23, 2003.
PCT Search Report cited in International Application No. PCT/US02/36291 mailed May 23, 2003.
PCT Search Report cited in International Application No. PCT/US03/03391 mailed Jul. 14, 2003.
PCT Search Report and Written Opinion cited in International Application No. PCT/US2005/001812 mailed May 2, 2005.
PCT Search Report and Written Opinion cited in International Application No. PCT/US2006/033965 mailed Feb. 9, 2007.
PCT Search Report and Written Opinion cited in International Application No. PCT/US2006/033965 Feb. 19, 2007.
PCT Written Opinion cited in International Application No. PCT/US00/15952 mailed Jul. 25, 2001.
PCT Written Opinion cited in International Application No. PCT/US00/15963 mailed Jun. 22, 2001.
PCT Written Opinion cited in International Application No. PCT/US00/16000 mailed Oct. 25, 2001.
PCT Written Opinion cited in International Application No. PCT/US01/02490 mailed Oct. 23, 2001.
PCT Written Opinion cited in International Application No. PCT/US01/06663 mailed Jan. 3, 2002.
PCT Written Opinion cited in International Application No. PCT/US01/10874 mailed Jun. 4, 2002.
PCT Written Opinion cited in International Application No. PCT/US01/14150 mailed Sep. 30, 2004.
PCT Written Opinion cited in International Application No. PCT/US02/20307 mailed Aug. 8, 2003.
PCT Written Opinion cited in International Application No. PCT/US02/20519 mailed Apr. 6, 2004.
PCT Written Opinion cited in International Application No. PCT/US02/24704 mailed Nov. 20, 2003.
PCT Written Opinion cited in International Application No. PCT/US02/28212 mailed Dec. 4, 2003.
Reid, Dixie, "Coming attractions before they hit the big screen, most films begin life as a trailer," *The Sacramento Bee*, Sacramento, California, p. E.1 (Jul. 18, 1996).
Remote Wonder, ATI, Tweak 3D, pp. 1-5 (Sep. 30, 2002).
Reply Brief in U.S. Appl. No. 09/565,931 mailed on Sep. 17, 2007.
Supplementary European Search Report cited in European Application No. 02737593.0 mailed Mar. 3, 2009.
Supplementary European Search Report cited in European Application No. 02750416.6 mailed Jan. 2, 2007.
Supplementary European Search Report cited in European Application No. 02761572.3 mailed Mar. 20, 2007.
Supplementary European Search Report cited in European Application No. 02797096.1 mailed Oct. 14, 2005.
Supplementary European Search Report cited in European Application No. 03713364.2 mailed Jul. 6, 2005.
U.S. Final Office Action cited in U.S. Appl. No. 09/518,041 mailed Jul. 7, 2008.
U.S. Non-Final Office Action cited in U.S. Appl. No. 09/518,041 mailed Jan. 10, 2008.
U.S. Final Office Action cited in U.S. Appl. No. 09/518,041 mailed Aug. 24, 2007.
U.S. Non-Final Office Action cited in U.S. Appl. No. 09/518,041 mailed Feb. 6, 2007.
U.S. Final Office Action cited in U.S. Appl. No. 09/518,041 mailed Aug. 28, 2006.
U.S. Non-Final Office Action cited in U.S. Appl. No. 09/518,041 mailed Apr. 4, 2006.
U.S. Final Office Action cited in U.S. Appl. No. 09/518,041 mailed Sep. 15, 2005.
U.S. Non-Final Office Action cited in U.S. Appl. No. 09/518,041 mailed Apr. 22, 2005.
U.S. Final Office Action cited in U.S. Appl. No. 09/518,041 mailed Oct. 20, 2004.
U.S. Non-Final Office Action cited in U.S. Appl. No. 09/518,041 mailed Feb. 11, 2004.
U.S. Final Office Action cited in U.S. Appl. No. 09/518,041 mailed Aug. 27, 2003.
U.S. Non-Final Office Action cited in U.S. Appl. No. 09/518,041 mailed Mar. 18, 2003.
U.S. Final Office Action cited in U.S. Appl. No. 09/542,484 mailed Jun. 17, 2008.
U.S. Non-Final Office Action cited in U.S. Appl. No. 09/542,484 mailed Dec. 7, 2007.
U.S. Non-Final Office Action cited in U.S. Appl. No. 09/542,484 mailed Mar. 12, 2007.
U.S. Non-Final Office Action cited in U.S. Appl. No. 09/542,484 mailed Sep. 7, 2006.
U.S. Final Office Action cited in U.S. Appl. No. 09/542,484 mailed Mar. 21, 2006.
U.S. Non-Final Office Action cited in U.S. Appl. No. 09/542,484 mailed Jul. 28, 2005.
U.S. Final Office Action cited in U.S. Appl. No. 09/542,484 mailed Mar. 22, 2005.
U.S. Non-Final Office Action cited in U.S. Appl. No. 09/542,484 mailed Apr. 1, 2004.
U.S. Non-Final Office Action cited in U.S. Appl. No. 09/565,931 mailed Oct. 28, 2009.
U.S. Final Office Action cited in U.S. Appl. No. 09/565,931 mailed Jul. 14, 2009.
U.S. Non-Final Office Action cited in U.S. Appl. No. 09/565,931 mailed Feb. 13, 2009.
U.S. Final Office Action cited in U.S. Appl. No. 09/565,931 mailed Jun. 15, 2006.
U.S. Non-Final Office Action cited in U.S. Appl. No. 09/565,931 mailed Jan. 11, 2006.
U.S. Final Office Action cited in U.S. Appl. No. 09/565,931 mailed Jul. 1, 2005.
U.S. Non-Final Office Action cited in U.S. Appl. No. 09/565,931 mailed Sep. 10, 2004.
U.S. Final Office Action cited in U.S. Appl. No. 09/590,434 mailed May 11, 2006.
U.S. Non-Final Office Action cited in U.S. Appl. No. 09/590,434 mailed Nov. 21, 2005.
U.S. Final Office Action cited in U.S. Appl. No. 09/590,434 mailed Dec. 1, 2004.
U.S. Non-Final Office Action cited in U.S. Appl. No. 09/590,434 mailed Apr. 22, 2004.
U.S. Final Office Action cited in U.S. Appl. No. 09/590,434 mailed Dec. 18, 2003.
U.S. Non-Final Office Action cited in U.S. Appl. No. 09/590,434 mailed May 23, 2003.
U.S. Final Office Action cited in U.S. Appl. No. 09/590,488 mailed Feb. 27, 2007.
U.S. Non-Final Office Action cited in U.S. Appl. No. 09/590,488 mailed Oct. 26, 2006.
U.S. Final Office Action cited in U.S. Appl. No. 09/590,488 mailed Jul. 10, 2006.
U.S. Non-Final Office Action cited in U.S. Appl. No. 09/590,488 mailed Dec. 20, 2005.
U.S. Final Office Action cited in U.S. Appl. No. 09/590,488 mailed Jun. 30, 2005.
U.S. Non-Final Office Action cited in U.S. Appl. No. 09/590,488 mailed Nov. 16, 2004.
U.S. Final Office Action cited in U.S. Appl. No. 09/590,488 mailed Jun. 7, 2004.

U.S. Final Office Action cited in U.S. Appl. No. 09/590,488 mailed Dec. 16, 2003.
U.S. Non-Final Office Action cited in U.S. Appl. No. 09/590,488 mailed Jun. 10, 2003.
U.S. Final Office Action cited in U.S. Appl. No. 09/590,904 mailed Sep. 13, 2007.
U.S. Non-Final Office Action cited in U.S. Appl. No. 09/590,904 mailed Mar. 26, 2007.
U.S. Final Office Action cited in U.S. Appl. No. 09/590,904 mailed Nov. 15, 2006.
U.S. Non-Final Office Action cited in U.S. Appl. No. 09/590,904 mailed May 31, 2006.
U.S. Final Office Action cited in U.S. Appl. No. 09/590,904 mailed Jan. 24, 2006.
U.S. Non-Final Office Action cited in U.S. Appl. No. 09/590,904 mailed Jul. 13, 2005.
U.S. Final Office Action cited in U.S. Appl. No. 09/590,904 mailed Jan. 11, 2005.
U.S. Non-Final Office Action cited in U.S. Appl. No. 09/590,904 mailed Jun. 4, 2004.
U.S. Final Office Action cited in U.S. Appl. No. 09/591,356 mailed Apr. 13, 2006.
U.S. Non-Final Office Action cited in U.S. Appl. No. 09/591,356 mailed Dec. 20, 2005.
U.S. Final Office Action cited in U.S. Appl. No. 09/591,356 mailed Jun. 30, 2005.
U.S. Final Office Action cited in U.S. Appl. No. 09/591,356 mailed May 10, 2004.
U.S. Non-Final Office Action cited in U.S. Appl. No. 09/591,356 mailed Jan. 14, 2004.
U.S. Final Office Action cited in U.S. Appl. No. 09/591,356 mailed Sep. 26, 2003.
U.S. Non-Final Office Action cited in U.S. Appl. No. 09/591,356 mailed May 21, 2003.
U.S. Final Office Action cited in U.S. Appl. No. 09/692,920 mailed Jul. 22, 2008.
U.S. Non-Final Office Action cited in U.S Appl. No. 09/692,920 mailed Jan. 17, 2008.
U.S. Final Office Action cited in U.S. Appl. No. 09/692,920 mailed Jun. 14, 2007.
U.S. Non-Final Office Action cited in U.S. Appl. No. 09/692,920 mailed Nov. 24, 2006.
U.S. Final Office Action cited in U.S. Appl. No. 09/692,920 mailed Jun. 21, 2006.
U.S. Non-Final Office Action cited in U.S. Appl. No. 09/692,920 mailed Feb. 16, 2006.
U.S. Final Office Action cited in U.S. Appl. No. 09/692,920 mailed Jun. 17, 2005.
U.S. Non-Final Office Action cited in U.S. Appl. No. 09/692,920 mailed Nov. 18, 2004.
U.S. Final Office Action cited in U.S. Appl. No. 09/692,995 mailed Sep. 4, 2009.
U.S. Non-Final Office Action cited in U.S. Appl. No. 09/692,995 mailed Jan. 23, 2009.
U.S. Final Office Action cited in U.S. Appl. No. 09/692,995 mailed Sep. 8, 2006.
U.S. Non-Final Office Action cited in U.S. Appl. No. 09/692,995 mailed Mar. 27, 2006.
U.S. Final Office Action cited in U.S. Appl. No. 09/692,995 mailed Sep. 21, 2005.
U.S. Final Office Action cited in U.S. Appl. No. 09/692,995 mailed May 3, 2005.
U.S. Non-Final Office Action cited in U.S. Appl. No. 09/692,995 mailed Oct. 21, 2004.
U.S. Final Office Action cited in U.S. Appl. No. 09/692,995 mailed Apr. 26, 2004.
U.S. Non-Final Office Action cited in U.S. Appl. No. 09/692,995 mailed Dec. 5, 2003.
U.S. Final Office Action cited in U.S. Appl. No. 09/693,115 mailed Jan. 25, 2005.
U.S. Non-Final Office Action cited in U.S. Appl. No. 09/693,115 mailed Jun. 16, 2004.
U.S. Final Office Action cited in U.S. Appl. No. 09/693,115 mailed Feb. 9, 2004.
U.S. Non-Final Office Action cited in U.S. Appl. No. 09/693,115 mailed Sep. 26, 2003.
U.S. Final Office Action cited in U.S. Appl. No. 09/693,288 mailed Dec. 1, 2005.
U.S. Non-Final Office Action cited in U.S. Appl. No. 09/693,288 mailed Jul. 19, 2005.
U.S. Final Office Action cited in U.S. Appl. No. 09/693,288 mailed Feb. 10, 2005.
U.S. Non-Final Office Action cited in U.S. Appl. No. 09/693,288 mailed Jul. 15, 2004.
U.S. Final Office Action cited in U.S. Appl. No. 09/693,288 mailed Feb. 26, 2004.
U.S. Non-Final Office Action cited in U.S. Appl. No. 09/693,288 mailed Oct. 27, 2003.
U.S. Final Office Action cited in U.S. Appl. No. 09/693,790 mailed Jul. 25, 2008.
U.S. Non-Final Office Action cited in U.S. Appl. No. 09/693,790 mailed Jan. 15, 2008.
U.S. Final Office Action cited in U.S. Appl. No. 09/693,790 mailed Jun. 19, 2007.
U.S. Non-Final Office Action cited in U.S. Appl. No. 09/693,790 mailed Dec. 28, 2006.
U.S. Final Office Action cited in U.S. Appl. No. 09/693,790 mailed Jun. 16, 2006.
U.S. Non-Final Office Action cited in U.S. Appl. No. 09/693,790 mailed Dec. 28, 2005.
U.S. Final Office Action cited in U.S. Appl. No. 09/693,790 mailed Jun. 21, 2005.
U.S. Non-Final Office Action cited in U.S. Appl. No. 09/693,790 mailed Oct. 6, 2004.
U.S. Final Office Action cited in U.S. Appl. No. 09/881,516 mailed Jun. 3, 2005.
U.S. Non-Final Office Action cited in U.S. Appl. No. 09/881,516 mailed Dec. 29, 2004.
U.S. Final Office Action cited in U.S. Appl. No. 09/881,516 mailed Jul. 26, 2004.
U.S. Final Office Action cited in U.S. Appl. No. 09/881,516 mailed Apr. 21, 2004.
U.S. Non-Final Office Action cited in U.S. Appl. No. 09/881,516 mailed Oct. 28, 2003.
U.S. Final Office Action cited in U.S. Appl. No. 09/894,508 mailed Sep. 17, 2009.
U.S. Non-Final Office Action cited in U.S. Appl. No. 09/894,508 mailed Feb. 4, 2009.
U.S. Final Office Action cited in U.S. Appl. No. 09/894,508 mailed Jun. 13, 2008.
U.S. Final Office Action cited in U.S. Appl. No. 09/894,508 mailed Dec. 31, 2007.
U.S. Non-Final Office Action cited in U.S. Appl. No. 09/894,508 mailed Jul. 26, 2007.
U.S. Non-Final Office Action cited in U.S. Appl. No. 09/896,231 mailed Nov. 17, 2009.
U.S. Final Office Action cited in U.S. Appl. No. 09/896,231 mailed Jun. 3, 2009.
U.S. Non-Final Office Action cited in U.S. Appl. No. 09/896,231 mailed Dec. 23, 2008.
U.S. Final Office Action cited in U.S. Appl. No. 09/896,231 mailed Dec. 29, 2005.
U.S. Non-Final Office Action cited in U.S. Appl. No. 09/896,231 mailed Jun. 23, 2005.
U.S. Final Office Action cited in U.S. Appl. No. 09/924,111 mailed Aug. 7, 2008.
U.S. Non-Final Office Action cited in U.S. Appl. No. 09/924,111 mailed Jan. 29, 2008.
U.S. Final Office Action cited in U.S. Appl. No. 09/924,111 mailed Oct. 5, 2007.
U.S. Non-Final Office Action cited in U.S. Appl. No. 09/924,111 mailed Apr. 19, 2007.
U.S. Final Office Action cited in U.S. Appl. No. 09/924,111 mailed Sep. 18, 2006.

U.S. Non-Final Office Action cited in U.S. Appl. No. 09/924,111 mailed Mar. 15, 2006.
U.S. Final Office Action cited in U.S. Appl. No. 09/947,890 mailed Nov. 24, 2009.
U.S. Non-Final Office Action cited in U.S. Appl. No. 09/947,890 mailed Apr. 10, 2009.
U.S. Final Office Action cited in U.S. Appl. No. 09/947,890 mailed Nov. 6, 2008.
U.S. Non-Final Office Action cited in U.S. Appl. No. 09/947,890 mailed Jun. 25, 2008.
U.S. Non-Final Office Action cited in U.S. Appl. No. 10/740,138 mailed Sep. 3, 2009.
U.S. Final Office Action cited in U.S. Appl. No. 10/740,138 mailed Mar. 19, 2009.
U.S. Non-Final Office Action cited in U.S. Appl. No. 10/740,138 mailed Sep. 15, 2008.
U.S. Final Office Action cited in U.S. Appl. No. 10/740,138 mailed Jun. 11, 2008.
U.S. Non-Final Office Action cited in U.S. Appl. No. 10/740,138 mailed Oct. 2, 2007.
U.S. Non-Final Office Action cited in U.S. Appl. No. 10/761,777 mailed Jun. 11, 2009.
U.S. Final Office Action cited in U.S. Appl. No. 10/761,777 mailed Dec. 19, 2008.
U.S. Non-Final Office Action cited in U.S. Appl. No. 10/761,777 mailed Jul. 18, 2007.
U.S. Non-Final Office Action cited in U.S. Appl. No. 10/761,777 mailed Jan. 24, 2007.
U.S. Final Office Action cited in U.S. Appl. No. 10/778,494 mailed Jul. 25, 2008.
U.S. Non-Final Office Action cited in U.S. Appl. No. 10/778,494 mailed Jan. 16, 2008.
U.S. Final Office Action cited in U.S. Appl. No. 10/778,494 mailed May 22, 2007.
U.S. Non-Final Office Action cited in U.S. Appl. No. 10/778,494 mailed Feb. 2, 2007.
U.S. Final Office Action cited in U.S. Appl. No. 10/778,494 mailed Aug. 28, 2006.
U.S. Non-Final Office Action cited in U.S. Appl. No. 10/778,494 mailed Dec. 29, 2004.
U.S. Final Office Action cited in U.S. Appl. No. 10/783,235 mailed Oct. 2, 2008.
U.S. Non-Final Office Action cited in U.S. Appl. No. 10/783,235 mailed Feb. 25, 2008.
U.S. Final Office Action cited in U.S. Appl. No. 10/934,253 mailed Dec. 23, 2009.
U.S. Non-Final Office Action cited in U.S. Appl. No. 10/934,253 mailed Jun. 26, 2009.
U.S. Final Office Action cited in U.S. Appl. No. 10/934,253 mailed Dec. 26, 2008.
U.S. Non-Final Office Action cited in U.S. Appl. No. 10/934,253 mailed Jun. 17, 2008.
U.S. Final Office Action cited in U.S. Appl. No. 10/934,253 mailed Jul. 24, 2007.
U.S. Non-Final Office Action cited in U.S. Appl. No. 10/934,253 mailed Feb. 9, 2007.
U.S. Non-Final Office Action cited in U.S. Appl. No. 10/934,253 mailed Sep. 14, 2006.
U.S. Final Office Action cited in U.S. Appl. No. 10/957,849 mailed Aug. 8, 2008.
U.S. Non-Final Office Action cited in U.S. Appl. No. 10/957,849 mailed Apr. 30, 2008.
U.S. Non-Final Office Action cited in U.S. Appl. No. 10/957,854 mailed Sep. 28, 2009.
U.S. Final Office Action cited in U.S. Appl. No. 10/957,854 mailed Apr. 7, 2009.
U.S. Non-Final Office Action cited in U.S. Appl. No. 10/957,854 mailed Oct. 15, 2008.
U.S. Non-Final Office Action cited in U.S. Appl. No. 10/957,854 mailed Apr. 30, 2008.
U.S. Final Office Action cited in U.S. Appl. No. 10/957,942 mailed Jul. 28, 2009.
U.S. Non-Final Office Action cited in U.S. Appl. No. 10/957,942 mailed Jan. 14, 2009.
U.S. Final Office Action cited in U.S. Appl. No. 10/957,942 mailed Jul. 31, 2008.
U.S. Non-Final Office Action cited in U.S. Appl. No. 10/957,942 mailed May 1, 2008.
U.S. Non-Final Office Action cited in U.S. Appl. No. 10/981,053 mailed Apr. 15, 2009.
U.S. Final Office Action cited in U.S. Appl. No. 10/981,053 mailed Aug. 6, 2008.
U.S. Non-Final Office Action cited in U.S. Appl. No. 10/891,053 mailed Jan. 2, 2008.
U.S. Final Office Action cited in U.S. Appl. No. 10/994,599 mailed Dec. 1, 2006.
U.S. Non-Final Office Action cited in U.S. Appl. No. 10/994,599 mailed May 16, 2006.
U.S. Final Office Action cited in U.S. Appl. No. 10/994,599 mailed Jan. 26, 2006.
U.S. Non-Final Office Action cited in U.S. Appl. No. 10/994,599 mailed Aug. 23, 2005.
U.S. Non-Final Office Action cited in U.S. Appl. No. 11/162,345 mailed Aug. 21, 2009.
U.S. Final Office Action cited in U.S. Appl. No. 11/162,345 mailed Mar. 9, 2009.
U.S. Non-Final Office Action cited in U.S. Appl. No. 11/162,345 mailed Oct. 31, 2008.
U.S. Non-Final Office Action cited in U.S. Appl. No. 11/170,348 mailed Sep. 30, 2009.
U.S. Final Office Action cited in U.S. Appl. No. 11/170,348 mailed May 28, 2009.
U.S. Non-Final Office Action cited in U.S. Appl. No. 11/170,348 mailed Dec. 11, 2008.
U.S. Final Office Action cited in U.S. Appl. No. 11/208,387 mailed Dec. 22, 2008.
U.S. Non-Final Office Action cited in U.S. Appl. No. 11/208,387 mailed Jun. 12, 2008.
U.S. Non-Final Office Action cited in U.S. Appl. No. 11/275,245 mailed Oct. 22, 2009.
U.S. Final Office Action cited in U.S. Appl. No. 11/275,245 mailed Jul. 29, 2009.
U.S. Non-Final Office Action cited in U.S. Appl. No. 11/275,245 mailed Sep. 22, 2008.
U.S. Non-Final Office Action cited in U.S. Appl. No. 11/460,516 mailed Jun. 26, 2009.
U.S. Final Office Action cited in U.S. Appl. No. 11/460,516 mailed Feb. 13, 2009.
U.S. Non-Final Office Action cited in U.S. Appl. No. 11/460,516 mailed Sep. 17, 2008.
U.S. Non-Final Office Action cited in U.S. Appl. No. 11/496,303 mailed Sep. 29, 2009.
U.S. Final Office Action cited in U.S. Appl. No. 11/496,303 mailed Apr. 1, 2009.
U.S. Non-Final Office Action cited in U.S. Appl. No. 11/496,303 mailed Sep. 18, 2008.
U.S. Final Office Action cited in U.S. Appl. No. 11/564,431 mailed Jan. 4, 2010.
U.S. Non-Final Office Action cited in U.S. Appl. No. 11/564,431 mailed Aug. 24, 2009.
U.S. Non-Final Office Action cited in U.S. Appl. No. 11/678,653 mailed Dec. 16, 2009.
U.S. Final Office Action cited in U.S. Appl. No. 12/127,968 mailed Dec. 1, 2009.
U.S. Non-Final Office Action cited in U.S. Appl. No. 12/127,968 mailed Apr. 30, 2009.
U.S. Non-Final Office Action cited in U.S. Appl. No. 12/179,752 mailed Dec. 23, 2009.
U.S. Non-Final Office Action cited in U.S. Appl. No. 12/372,887 mailed Oct. 16, 2009.
U.S. Non-Final Office Action cited in U.S. Appl. No. 12/372,894 mailed Oct. 27, 2009.
U.S. Non-Final Office Action cited in U.S. Appl. No. 12/372,917 mailed Oct. 26, 2009.

U.S. Non-Final Office Action cited in U.S. Appl. No. 12/388,139 mailed Dec. 15, 2009.
U.S. Non-Final Office Action cited in U.S. Appl. No. 12/389,564 mailed Nov. 10, 2009.
U.S. Non-Final Office Action cited in U.S. Appl. No. 12/413,686 mailed Nov. 30, 2009.
U.S. Appl. No. 09/330,792, filed Jun. 11, 1999 entitled "Series Reminders and Series Recording from an Interactive Television program Guide".
U.S. Appl. No. 09/378,533, filed Aug. 20, 1999 entitled "Electronic Program Guide with Advance Notification".
U.S. Appl. No. 09/518,041, filed Mar. 2, 2000 entitled "Apparatus and Method for Providing a Plurality of Interactive Program Guide Initial Arrangements".
U.S. Appl. No. 09/542,484, filed Apr. 3, 2000 entitled "System for Providing Alternative Services".
U.S. Appl. No. 09/590,434, filed Jun. 9, 2000 entitled "Video Promotional and Advertising Systems for Video on Demand System".
U.S. Appl. No. 09/590,488, filed Jun. 9, 2000 entitled "User Interface Navigational System with Parental Control for Video on Demand System".
U.S. Appl. No. 09/590,521, filed Jun. 9, 2000 entitled "Systems and Methods for Adaptive Scheduling and Dynamic Bandwidth Resource Allocation Management in a Digital Broadband Delivery System".
U.S. Appl. No. 09/590,904, filed Jun. 9, 2000 entitled "Program Information Searching System for Interactive Program Guide".
U.S. Appl. No. 09/591,356, filed Jun. 9, 2000 entitled "Future Program Options Menu System for Interactive Program Guide".
U.S. Appl. No. 09/692,920, filed Oct. 20, 2000 entitled "Media-on-Demand Title Indexing System".
U.S. Appl. No. 09/692,995, filed Oct. 20, 2000 entitled "Media-on-Demand Bookmark System".
U.S. Appl. No. 09/693,115, filed Oct. 20, 2000 entitled "Media Services Window Configuration System".
U.S. Appl. No. 09/693,288, filed Oct. 20, 2000 entitled "Media-on-Demand Rental Duration Management System".
U.S. Appl. No. 09/693,790, filed Oct. 20, 2000 entitled "Integrated Searching System for Interactive Media Guide".
U.S. Appl. No. 09/565,931, filed May 4, 2000 entitled "Navigation Paradigm for Access to Television Services".
U.S. Restriction Requirement cited in U.S. Appl. No. 11/162,345 mailed Jul. 3, 2008.
VESA Plug and Display Standard, Version 1, Video Electronics Standards Association, XP-002123075, 90 pages (Jun. 11, 1997).
W3C, Putting language attributes in HTML, www.w3.org.org/International/O-help-lang, 2 pages (Apr. 29, 1997).
U.S. Final Office Action cited in U.S. Appl. No. 10/740,138 mailed Jan. 15, 2010.
U.S. Non-final Office Action cited in U.S. Appl. No. 10/761,777 mailed Jan. 21, 2010.
U.S. Final Office Action cited in U.S. Appl. No. 10/981,053 mailed Jan. 21, 2010.
U.S. Final Office Action cited in U.S. Appl. No. 11/170,348 mailed Feb. 1, 2010.
U.S. Non-Final Office Action cited in U.S. Appl. No. 12/179,767 mailed Jan. 22, 2010.
U.S. Non-Final Office Action cited in U.S. Appl. No. 11/496,303 mailed Mar. 2, 2010.
Rottentomatoes web archived site, http://web.archive.org/web/20000301122211/http://rottentomatoes.com, Mar. 1, 2000, pp. 1-2.
Alberico, G. et al., "Satellite Interactive Multimedia: A New Opportunity for Broadcasters," *International Broadcasting Convention*, Conference Publication No. 447, pp. 18-23 (Sep. 12-16, 1997).
European Examination Report cited in Application No. 00 938 251.6 mailed Mar. 2, 2010.
European Examination Report cited in Application No. 01 937 209.3 mailed Mar. 16, 2010.
Japanese Office Action cited in Application No. 2001-581527 mailed Feb. 10, 2010.
Little et al., "Prospects for Interactive Video-On-Demand", IEEE Multimedia, IEEE Service Center, New York, NY US, vol. 1 No. 3, Sep. 1994, pp. 14-24, XP000476885 ISSN: 1070-986X.
Petit et al., "Bandwidth Resource Optimization in Video-On-Demand Network Architectures", Community Networking Integrated Multimedia Services to the Home, 1994, Proceedings of the 1st International Workshop on San Francisco, CA USA, Jul. 1994, New York, NY USA, IEEE, Jul. 1994, pp. 91-97, XP010124402 ISBN: 978-0-7803-2076-5.
Supplementary European Search Report cited in European Application No. 02744705.1 mailed Feb. 19, 2010.
U.S. Final Office Action cited in U.S. Appl. No. 11/162,345 mailed Mar. 16, 2010.
U.S. Final Office Action cited in U.S. Appl. No. 11/460,516 mailed Mar. 18, 2010.
U.S. Non-Final Office Action cited in U.S. Appl. No. 12/127,968 mailed Mar. 31, 2010.
U.S. Non-Final Office Action cited in U.S. Appl. No. 11/238,369 mailed Mar. 30, 2010.
U.S. Final Office Action cited in U.S. Appl. No. 10/957,854 mailed Apr. 1, 2010.
Canadian Office Action cited in Application No. 2,554,208 mailed Apr. 1, 2010.
U.S. Non-Final Office Action cited in U.S. Appl. No. 10/934,253 mailed Apr. 27, 2010.
U.S. Non-Final Office Action cited in U.S. Appl. No. 11/275,245 mailed May 5, 2010.
U.S. Final Office Action cited in U.S. Appl. No. 12/372,887 mailed Apr. 14, 2010.
U.S. Final Office Action cited in U.S. Appl. No. 12/372,917 mailed May 17, 2010.
U.S. Final Office Action cited in U.S. Appl. No. 12/389,564 mailed Apr. 28, 2010.
Canadian Office Action cited in Application No. 2,402,088 mailed Jun. 1, 2010.
Canadian Office Action cited in Application No. 2,405,491 mailed Jun. 9, 2010.
Summons to attend oral proceedings pursuant to Rule 115(1) EPC in European Application No. 02737593.0-1241 mailed May 28, 2010.
U.S. Non-Final Office Action cited in U.S. Appl. No. 09/693,288 mailed Jun. 21, 2010.
U.S. Final Office Action cited in U.S. Appl. No. 09/896,231 mailed May 28, 2010.
U.S. Final Office Action cited in U.S. Appl. No. 10/761,777 mailed Aug. 2, 2010.
U.S. Non-Final Office Action cited in U.S. Appl. No. 10/957,942 mailed Jun. 30, 2010.
U.S. Final Office Action cited in U.S. Appl. No. 11/496,303 mailed Jul. 22, 2010.
U.S. Non-Final Office Action cited in U.S. Appl. No. 11/564,431 mailed Jul. 20, 2010.
U.S. Final Office Action cited in U.S. Appl. No. 11/678,653 mailed Jun. 23, 2010.
U.S. Non-Final Office Action cited in U.S. Appl. No. 11/963,942 mailed Jun. 8, 2010.
U.S. Non-Final Office Action cited in U.S. Appl. No. 11/963,945 mailed Jul. 16, 2010.
U.S. Non-Final Office Action cited in U.S. Appl. No. 12/180,416 mailed Jun. 25, 2010.
U.S. Final Office Action cited in U.S. Appl. No. 12/388,139 mailed Jul. 6, 2010.
U.S. Non-Final Office Action cited in U.S. Appl. No. 12/389,128 mailed Jun. 2, 2010.
U.S. Final Office Action cited in U.S. Appl. No. 12/413,686 mailed Jun. 10, 2010.
U.S. Non-Final Office Action cited in U.S. Appl. No. 11/234,967 mailed Sep. 10, 2010.
U.S. Final Office Action cited in U.S. Appl. No. 11/238,369 mailed Aug. 31, 2010.
U.S. Non-Final Office Action cited in U.S. Appl. No. 11/963,951 mailed Aug. 2, 2010.
U.S. Final Office Action cited in U.S. Appl. No. 12/127,968 mailed Sep. 14, 2010.
U.S. Final Office Action cited in U.S. Appl. No. 12/179,767 mailed Aug. 20, 2010.

U.S. Non-Final Office Action cited in U.S. Appl. No. 12/388,002 mailed Sep. 3, 2010.
U.S. Non-Final Office Action cited in U.S. Appl. No. 12/389,564 mailed Aug. 23, 2010.
Canadian Office Action cited in Application No. 2,408,289 mailed Sep. 2, 2010, 3 pages.
Canadian Office Action cited in Application No. 2,456,318 mailed Nov. 17, 2010, 4 pages.
Canadian Office Action cited in Application No. 2,451,477 mailed Oct. 20, 2010, 4 pages.
U.S. Non-Final Office Action cited in U.S. Appl. No. 10/740,138 mailed Oct. 27, 2010, 23 pages.
U.S. Non-Final Office Action cited in U.S. Appl. No. 10/934,253 mailed Nov. 4, 2010, 10 pages.
U.S. Non-Final Office Action cited in U.S. Appl. No. 11/170,348 mailed Oct. 26, 2010, 13 pages.
U.S. Non-Final Office Action cited in U.S. Appl. No. 12/179,763 mailed Jan. 4, 2011, 18 pages.
U.S. Final Office Action cited in U.S. Appl. No. 12/389,128 mailed Nov. 9, 2010, 50 pages.
U.S. Non-Final Office Action cited in U.S. Appl. No. 12/389,564 mailed Jan. 21, 2011, 13 pages.
U.S. Non-Final Office Action cited in U.S. Appl. No. 12/390,418 mailed Sep. 28, 2010, 13 pages.
U.S. Non-Final Office Action cited in U.S. Appl. No. 12/390,420 mailed Oct. 19, 2010, 12 pages.
U.S. Non-Final Office Action cited in U.S. Appl. No. 12/390,422 mailed Oct. 20, 2010, 13 pages.
"Industry Leading Software Vendors Endorse BroadVision's Next Generation of Retail and Business-To-Business E-Commerce Application Solutions," PR Newswire, Jun. 14, 1999, 4 pages.
U.S. Final Office Action cited in U.S. Appl. No. 09/693,288 mailed Feb. 8, 2011, 28 pages.
U.S. Non-Final Office Action cited in U.S. Appl. No. 11/162,345 mailed Feb. 1, 2011, 33 pages.
Canadian Office Action cited in Application No. 2,459,334 mailed Mar. 4, 2011, 3 pages.
Summons to attend oral proceedings in EP Application No. 01937209.3 mailed Mar. 21, 2011, 7 pages.
U.S. Non-Final Office Action cited in U.S. Appl. No. 12/413,686 mailed Mar. 17, 2011, 20 pages.
U.S. Non-Final Office Action cited in U.S. Appl. No. 10/761,777 mailed Apr. 12, 2011, 20 pages.
U.S. Non-Final Office Action cited in U.S. Appl. No. 10/934,253 mailed Apr. 29, 2011, 11 pages.
Canadian Office Action dated May 31, 2011 cited in Application No. 2,621,605.
U.S. Final Office Action cited in U.S. Appl. No. 12/389,564 mailed May 19, 2011, 15 pages.
U.S. Non-Final Office Action cited in U.S. Appl. No. 10/740,138 mailed Jun. 8, 2011, 26 pages.
U.S. Final Office Action cited in U.S. Appl. No. 11/170,348 mailed Jun. 9, 2011, 14 pages.
US 7,934,240, 04/2011, Rodriguez et al. (withdrawn)
US 7,934,241, 04/2011, Jerding et al. (withdrawn)
US 7,934,242, 04/2011, Rodriguez (withdrawn)

* cited by examiner

110B

DELETION CONFIRMATION

Do You Want To Delete The Title "Angela's Ashes" Permanently Or Just During This Session?

D Delete Permanently

E Delete Temporarily

FIG. 7

MANAGING REMOVAL OF MEDIA TITLES FROM A LIST

CROSS-REFERENCE TO RELATED APPLICATIONS

This application is a continuation of application Ser. No. 09/692,986, filed Oct. 20, 2000 now U.S. Pat. No. 6,978,310, which is a continuation-in-part of application Ser. No. 09/590,488, filed on Jun. 9, 2000, which are entirely incorporated herein by reference.

FIELD OF THE INVENTION

This invention relates in general to television systems, and more particularly, to the field of media-on-demand.

BACKGROUND OF THE INVENTION

With recent advances in digital transmission technology, cable television systems are now capable of providing much more than the traditional analog broadcast video. In implementing enhanced programming, the home communication terminal ("HCT"), otherwise known as the settop box, has become an important computing device for accessing video services and navigating a subscriber through a maze of available services. In addition to supporting traditional analog broadcast video functionality, digital HCTs (or "DHCTs") now also support an increasing number of two-way digital services such as video-on-demand.

Typically, a DHCT is connected to a cable or satellite television network and includes hardware and software necessary to provide the functionality of the digital television system at the client's site. Preferably, some of the software executed by a DHCT is downloaded and/or updated via the cable television network. Each DHCT also typically includes a processor, communication components and memory, and is connected to a television or other display device, such as a personal computer. While many conventional DHCTs are stand-alone devices that are externally connected to a television, a DHCT and/or its functionality may be integrated into a television or personal computer, as will be appreciated by those of ordinary skill in the art.

DHCTs are capable of providing users with a very large number and variety of purchasable media rentals and/or non-purchasable on-demand media. Given the vast number of years that film and television studios have produced movies, television programs and audio programs, copious media titles can be offered for convenient on-demand viewing. As the number of available on-demand media increases, it can become inconvenient and time consuming for users to continually browse through unwanted media titles in order to find the ones that they like. Therefore there exists a need to make it easier and more convenient for users to browse through available media titles.

SUMMARY OF THE INVENTION

The invention can be viewed as a system for providing media information to a user via an interactive media services client device coupled to a programmable television services server device. A method of the preferred embodiment of the present invention includes receiving user input and excluding one or more media titles from a media title list based on the user input.

BRIEF DESCRIPTION OF THE DRAWINGS

The invention can be better understood with reference to the following drawings. The components in the drawings are not necessarily drawn to scale, emphasis instead being placed upon clearly illustrating the principles of the present invention. In the drawings, like reference numerals designate corresponding parts throughout the several views.

FIG. 7 depicts an alternative embodiment to the deletion confirmation window shown in FIG. 6.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
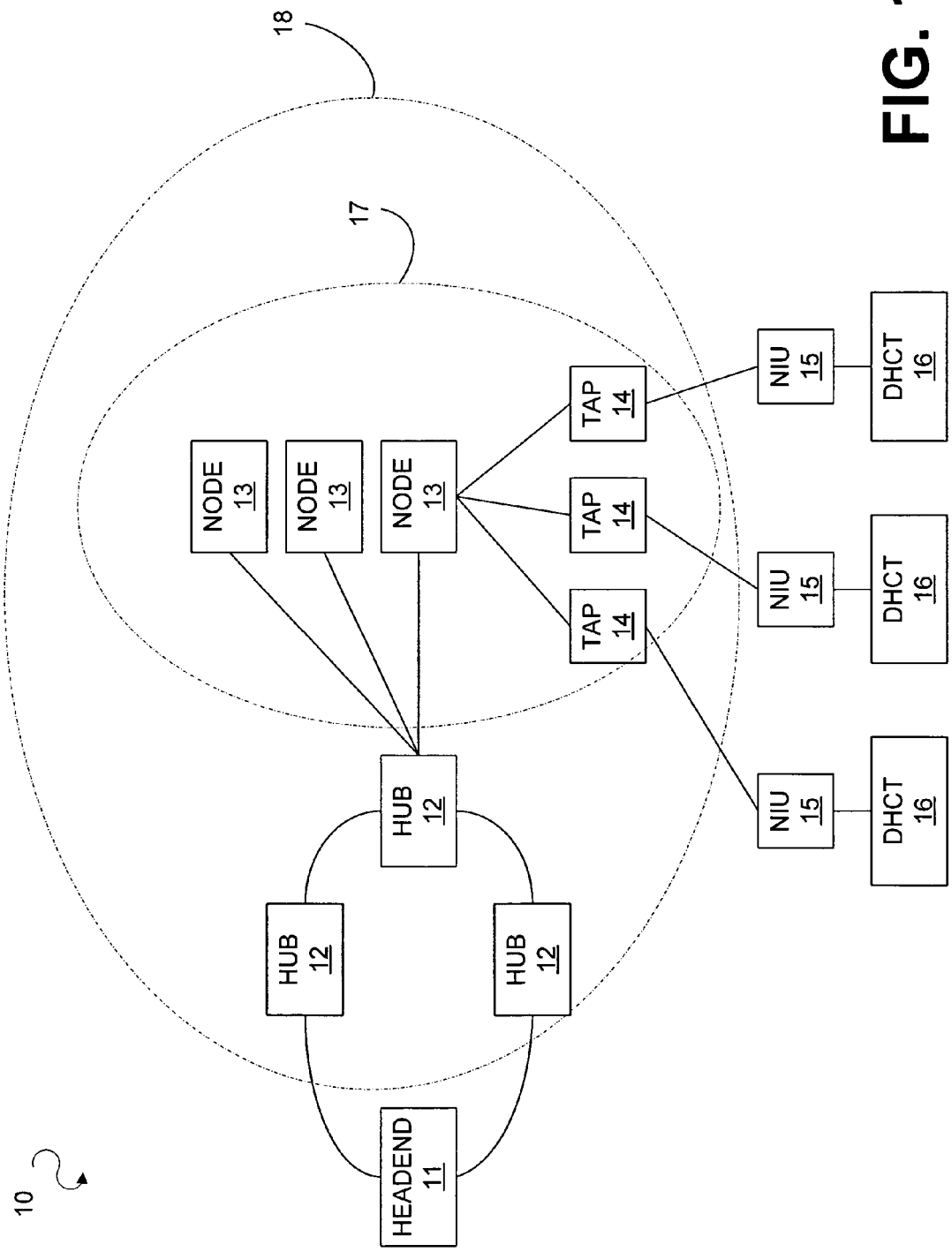
FIG. 1 is a block diagram of a cable television system in accordance with one preferred embodiment of the present invention.

The present invention is generally implemented as part of a cable television system (CTS). Hence, an illustrative CTS 10 and its operation will be described initially. FIG. 1 shows a block diagram view of a CTS 10, which is generally a high quality, reliable and integrated network system that features video, audio, voice and data services to DHCT users. Although FIG. 1 depicts a high level view of a CTS 10, it should be appreciated that a plurality of cable television systems can tie together a plurality of regional networks into an integrated global network so that DHCT users can receive content provided from anywhere in the world.

The CTS 10 delivers broadcast video signals as digitally formatted signals in addition to delivering traditional broadcast analog video signals. Furthermore, the system can support one way broadcast services as well as both one-way data services and two-way media and data services. The two-way operation of the network allows for user interactivity with services, such as Pay-Per-View programming, Near Video-On-Demand (NVOD) programming according to any of several known NVOD implementation methods, View-on-Demand (VOD) programming (according to any of several known VOD implementation methods), and interactive applications, such as Internet connections and interactive media Guide (IMG) applications.

The CTS 10 also provides the interfaces, network control, transport control, session control, and servers to access content and services, and distributes content and services to DHCT users. As shown in FIG. 1, a typical CTS 10 comprises a headend 11, hubs 12, an HFC access network 17, and users' digital home communication terminals (DHCTs) 16. It should be appreciated that although a single component (e.g. a headend) is illustrated in FIG. 1, a CTS 10 can feature a plurality of any one of the illustrated components or may be configured with alternative embodiments for any one of the individual components or with yet other additional components not enumerated above. A content provider (not shown) transmits media content to a headend for further transmission to users downstream in the network.

Content provided by a content provider is communicated by the content provider to one or more headends 11. From those headends the content is then communicated over a communications network 18 that includes a plurality of HFC access networks 17 (only one HFC access network 17 is illustrated). The HFC access network 17 typically comprises a plurality of HFC nodes 13, each of which may serve a local geographical area. The hub 12 connects to the HFC node 13 through a fiber portion of the HFC access network 17. The HFC node 13 is connected to a tap 14 which is connected to a network interface unit (NIU) 15 which is connected to a DHCT 16. The NIU 15 is normally located at a user's property and provides a transparent interface between the HFC node 13 and the users' internal wiring. Coaxial cables are typically used to couple nodes 13, taps 14 and NIUs 15 because the electrical signals can be easily repeated with radio frequency (RF) amplifiers.

As the high-level operations of many of the functions of CTSs 10 are well known to those of skill in the art, further description of the overall CTS 10 of FIG. 1 will not be contained herein. It will be appreciated, however, that the CTS 10 shown in FIG. 1 is merely illustrative and should not be construed as implying any limitations upon the scope of the present invention.

Figure 2:
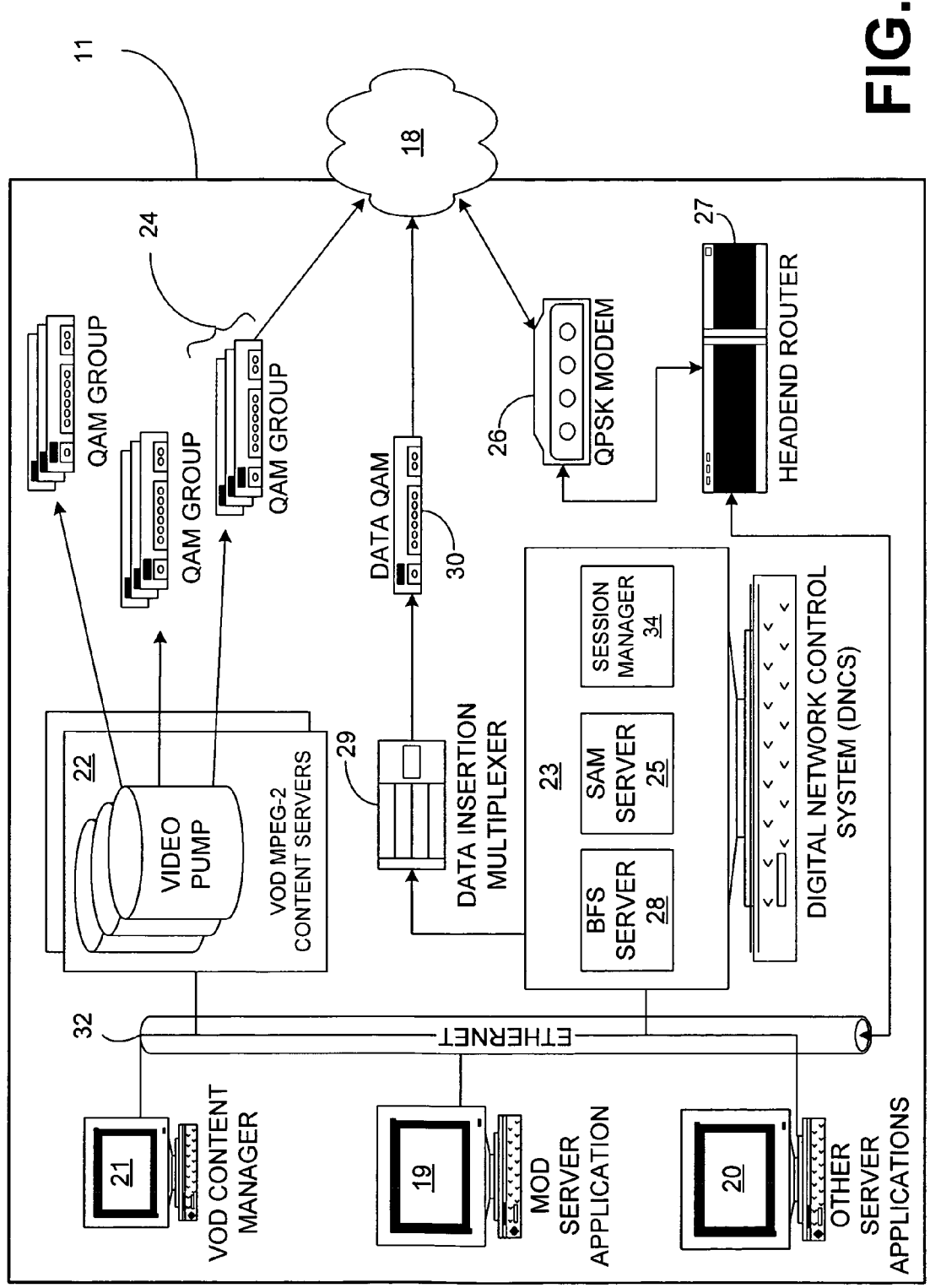
FIG. 2 is a diagram of the headend 11 as depicted in FIG. 1.

FIG. 2 is a block diagram of portions of a headend 11 that is configured to provide media-on-demand (MOD) services in accordance with one embodiment of the present invention. MOD services include, among other things, video-on-demand (VOD) services and respective MOD information suitable to be presented to a user via display of an interactive media guide. MOD server application 19 and a plurality of other server applications 20 are connected to a digital network control system (DNCS) 23 via a high-speed network such as an Ethernet connection 32. The MOD server application 19 is responsible for reserving and configuring system resources needed to provide MOD services and for providing configuration and service data to an MOD client application 63 (FIG. 3), including MOD information comprising a catalog of titles available for on-demand viewing and/or on-demand rental by a user.

The DNCS 23 provides complete management, monitoring, and control of the network's elements and broadcast services provided to users. In one implementation, the DNCS 23 uses a data insertion multiplexer 29 and a data QAM 30 to insert in-band broadcast file system (BFS) data into an MPEG-2 transport stream that is broadcast and received via DHCT's communication interface 42 and tuner system 45. The DNCS 23 also contains a session manager 34 that uses Digital Storage Media Command and Control (DSMCC) protocol to set up and maintain MOD sessions. The session manager 34 processes user to network (U-N) session signaling messages, manages allocation of session-related network resources, supports network management operations, acts as a point of contact to the network for the DHCT's 16 in the network 18 to establish individual sessions, and supports MOD services by providing the signaling interface to establish, maintain and release client initiated exclusive sessions.

A service application manager (SAM) server 25 is a server component of a client-server pair of components, with the client component being located at the DHCT 16. Together, the client-server SAM components provide a system in which the user can access services, which are identified by an application to run and a parameter, such as particular data content, specific to that service. The client-server SAM components also manage the life cycle of the applications on the system, including the definition, activation, and suspension of services they provide and the downloading of the applications into the DHCT 16 as necessary.

Applications on both the headend 11 and the DHCT 16 can access the data stored in a broadcast file system (BFS) server 28 in a similar manner to a file system found on operating systems. The BFS server 28 is a part of a broadcast file system that has a counterpart BFS client module 43 (FIG. 3) in a DHCT 16 connected to the network 18. The BFS server 28 repeatedly sends data for applications on a data carousel (not shown) over a period of time in cyclical repeated fashion so that a DHCT 16 that is in need of reading any particular data file or parts thereof may receive it when requested by a user or one or more of its internal running processes.

A VOD content manager 21 is responsible for managing the content on the VOD content servers 22. The MOD server application 19 controls both the VOD content manager 21 and the VOD content servers 22 and utilizes them to help deliver the video and audio streams that make up VOD services. In one embodiment, an MOD content manager and MOD content servers (not shown) could run respectively in parallel to the VOD content manager 21 and VOD content servers 22 to manage other types of on-demand media content. In an alternate embodiment an MOD content manager replaces the VOD content manager 21 and the MOD content servers replaces the VOD content servers 22. The QAM modulators that comprise the QAM group 24 receive the MPEG-2 transport streams from the VOD content servers 22, convert them into encrypted RF signals at a specified frequency (channel), and transmit them to a DHCT 16 via the network 18.

The QPSK modem 26 is responsible for transporting the out-of-band IP (internet protocol) datagram traffic between the distribution headend 11 and a DHCT 16. Data from the QPSK modem 26 is routed by headend router 27 within the headend 11. The headend router 27 is also responsible for delivering upstream application traffic to the various server applications 19 & 20.

Figure 3:
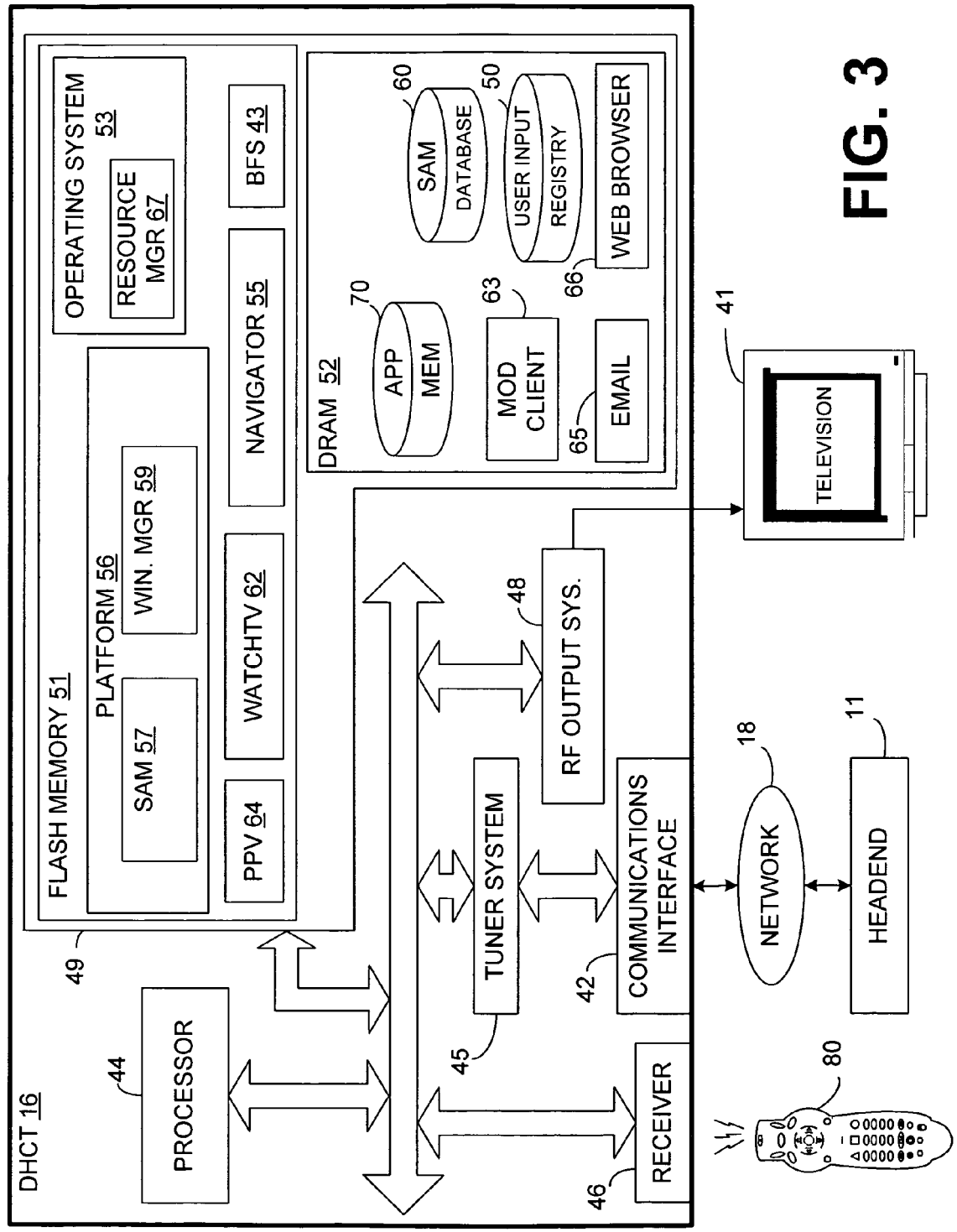
FIG. 3 is a block diagram of a DHCT and related equipment, in accordance with one preferred embodiment of the present invention depicted in FIG. 1.

FIG. 3 is a block diagram illustrating a DHCT 16 that is coupled to a headend 11 and to a television 41. Some of the functionality performed by applications executed in the DHCT 16 (such as the MOD client application 63) may instead be performed at the headend 11 and vice versa. A DHCT 16 is typically situated at a user's residence or place of business and may be a stand alone unit or integrated into another device such as, for example, a television set or a personal computer. The DHCT 16 preferably includes a communications interface 42 for receiving signals (video, audio and/or other data) from the headend 11 through the network 18 and for providing any reverse information to the headend 11 through the network 18. The DHCT 16 further includes at least one processor 44 for controlling operations of the DHCT 16, an RF output system 48 for driving the television display 41, and a tuner system 45 for tuning into a particular television channel to be displayed and for sending and receiving various types of data or media from the headend 11. The tuner system 45 includes, in one implementation, an out-of-band tuner for bi-directional quadrature phase shift keying (QPSK) data communication and a quadrature amplitude modulation (QAM) tuner for receiving television signals. Additionally, a receiver 46 receives externally-generated information, such as user inputs or commands from other devices.

The DHCT 16 may also include one or more wireless or wired interfaces, also called ports, for receiving and/or transmitting data to other devices. For instance, the DHCT 16 may feature USB (Universal Serial Bus), Ethernet (for connection to a computer), IEEE-1394 (for connection to media devices in an entertainment center), serial, and/or parallel ports. The user inputs may, for example, be provided by a computer or transmitter with buttons or keys located either on the exterior of the terminal or by a hand-held remote control device or keyboard that includes user-actuated buttons.

In one implementation, the DHCT 16 includes system memory 49, which includes flash memory 51 and dynamic random access memory (DRAM) 52, for storing various applications, modules and data for execution and use by the processor 44. Basic functionality of the DHCT 16 is provided by an operating system 53 that is primarily stored in flash memory 51. Among other things, the operating system 53 includes at least one resource manager 67 that provides an interface to resources of the DHCT 16 such as, for example, computing resources.

One or more programmed software applications, herein referred to as applications, are executed by utilizing the computing resources in the DHCT 16. Applications stored in flash memory 51 or DRAM 52 are executed by processor 44 (e.g., a central processing unit or digital signal processor) under the auspices of the operating system 53. Data required as input by an application is stored in DRAM 52 or flash memory 51 and read by processor 44 as need be during the course of the application's execution. Input data may be data stored in DRAM 52 by a secondary application or other source, either internal or external to the DHCT 16, or possibly anticipated by the application and thus created with the application at the time it was generated as a software application, in which case it is stored in flash memory 51. Data generated by an application is stored in DRAM 52 by processor 44 during the course of the application's execution. DRAM 52 also includes application memory 70 that various applications may use for storing and/or retrieving data.

An application referred to as navigator 55 is also resident in flash memory 51 for providing a navigation framework for services provided by the DHCT 16. The navigator 55 registers for and in some cases reserves certain user inputs related to navigational keys such as channel increment/decrement, last channel, favorite channel, etc. The client applications may be resident in flash memory 51 or downloaded into DRAM 52. The navigator 55 also provides users with television related menu options that correspond to DHCT functions such as, for example, providing an interactive program guide, blocking a channel or a group of channels from being displayed in a channel menu, and displaying a video-on-demand purchase list.

The flash memory 51 also contains a platform library 56. The platform library 56 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 56 that are shown in FIG. 3 are a window manager 59 and a service application manager (SAM) client 57.

The window manager 59 provides a mechanism for implementing the sharing of the screen regions and user input. The window manager 59 on the DHCT 16 is responsible for, as directed by one or more applications, implementing the creation, display, and de-allocation of the limited DHCT 16 screen resources. It allows multiple applications to share the screen by assigning ownership of screen regions, or windows. The window manager 59 also maintains, among other things, a user input registry 50 in DRAM 52 so that when a user enters a key or a command via the remote control device 80 or another input device such as a keyboard or mouse, the user input registry 50 is accessed to determine which of various applications running on the DHCT 16 should receive data corresponding to the input key and in which order. As an application is executed, it registers a request to receive certain user input keys or commands. When the user presses a key corresponding to one of the commands on the remote control device 80, the command is received by the receiver 46 and relayed to the processor 44. The processor 44 dispatches the event to the operating system 53 where it is forwarded to the window manager 59 which ultimately accesses the user input registry 50 and routes data corresponding to the incoming command to the appropriate application.

The SAM client 57 is a client component of a client-server pair of components, with the server component being located on the headend 11. A SAM database 60 in DRAM 52 includes a data structure of services and a data structure of channels that are created and updated by the headend 11. Many services can be defined using the same application component, with different parameters. Examples of services include, without limitation and in accordance with one implementation, presenting television programs (available through a WatchTV application 62), pay-per-view events (available through a PPV application 64), digital music (not shown), media-on-demand (available through an MOD application 63), and an interactive program guide. In general, the identification of a service includes the identification of an executable application that provides the service along with a set of application-dependent parameters that indicate to the application the service to be provided. As a non-limiting example, a service of presenting a television program could be executed with a set of parameters to view HBO or with a separate set of parameters to view CNN. Each association of the application component (tune video) and one parameter component (HBO or CNN) represents a particular service that has a unique service I.D. The SAM client 57 also interfaces with the resource manager 67, as discussed below, to control resources of the DHCT 16.

Application clients can also be downloaded into DRAM 52 at the request of the SAM client 57, typically in response to a request by the user or in response to a message from the headend. In this non-limiting example DRAM 52 contains a media-on-demand application (MOD) 63, an e-mail application 65, and a web browser application 66, among others (not shown). It should be clear to one with ordinary skill in the art that these applications are not limiting and merely serve as examples for this present embodiment of the invention. Furthermore, one or more DRAM based applications may, as an alternative embodiment, be resident in flash memory 51. These applications, and others provided by the cable system operator, are top level software entities on the network for providing services to the user.

In one implementation, applications executing on the DHCT 16 work with the navigator 55 by abiding by several guidelines. First, an application utilizes the SAM client 57 for the provision, activation, and suspension of services. Second, an application shares DHCT 16 resources with other applications and abides by the resource management policies of the SAM client 57, the operating system 53, and the DHCT 16. Third, an application handles situations where resources are only available with navigator 55 intervention. Fourth, when an application loses service authorization while providing a service, the application suspends the service via the SAM (the navigator 55 will reactivate an individual service application when it later becomes authorized). Finally, an application client is designed to not have access to certain user input keys reserved by the navigator (i.e., power, channel +/−, volume +/−, etc.).

The MOD client application 63 provides the user with lists of available media titles to choose from and with video presentations requested by the user. The MOD client application 63 provides video presentations to the user by engaging, preferably, in a direct two-way IP (Internet Protocol) connection with VOD content servers 22 (FIG. 2). The MOD client application 63 is also responsible for providing title deletion functionality as described below. In an alternative embodiment, the title deletion functionality is provided by a separate application that can be selectively aggregated to the MOD client application 63 for purposes of charging separately for that functionality.

An executable program or algorithm corresponding to an operating system (OS) component, or to a client platform component, or to a client application, or to respective parts thereof, can reside in and execute out of DRAM 52 and/or flash memory 51. Likewise, data inputted into or outputted from any executable program can reside in DRAM 52 or flash memory 51. Furthermore, an executable program or algorithm corresponding to an OS component, or to a client platform component, or to a client application, or to respective parts thereof, can reside in flash memory 51, or in a local storage device connected to DHCT 16 and be transferred into DRAM 52 for execution. Likewise, data input for an executable program can reside in flash memory 51 or a storage device and be transferred into DRAM 52 for use by an executable program or algorithm. In addition, data outputted by an executable program can be written into DRAM 52 by an executable program or algorithm and be transferred into flash memory 51 or into a storage device for storage purposes. The present invention is not limited by where or how data and/or applications are stored or retrieved.

Each of the above mentioned applications comprises executable instructions for implementing logical functions and can be embodied in any computer-readable medium for use by or in connection with an instruction execution system, apparatus, or device, such as a computer-based system, processor-containing system, or other system that can fetch and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner, and then stored in a computer memory.

Figure 4:
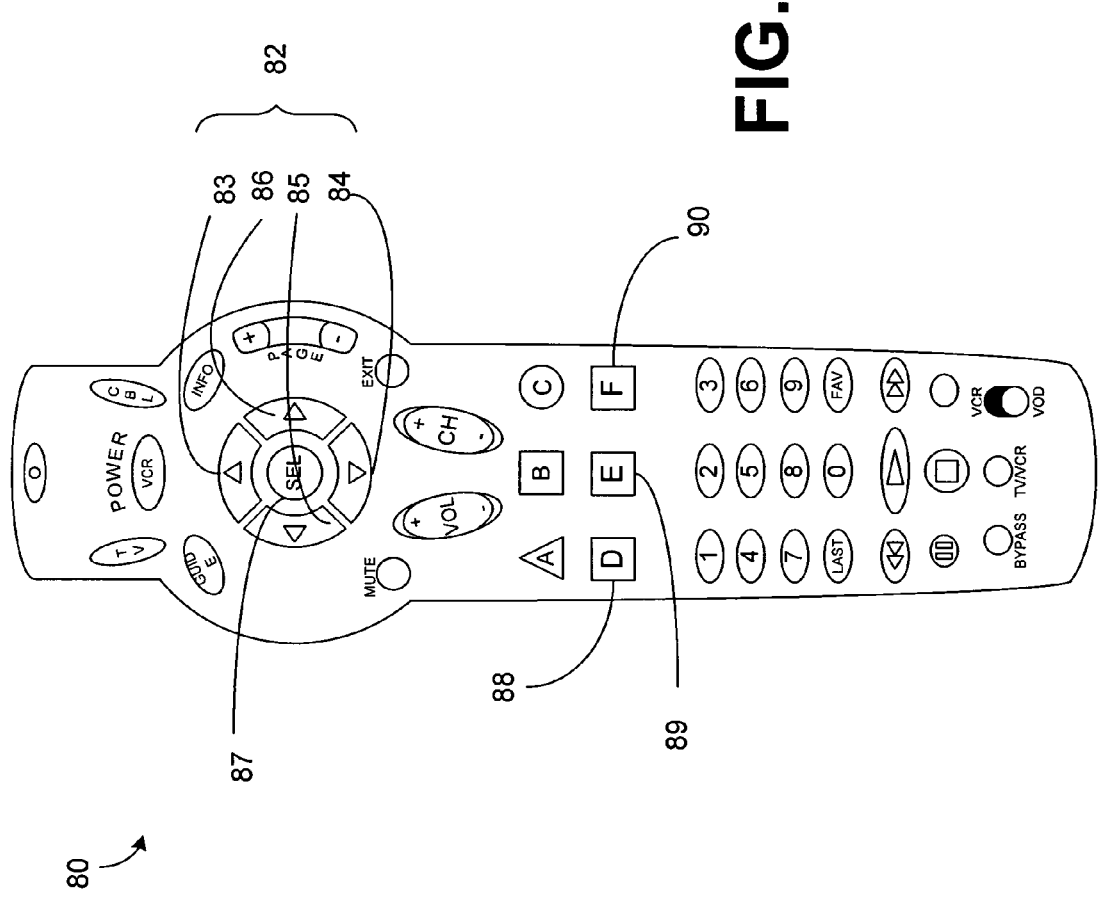
FIG. 4 is a remote control device that can be used to provide user input to the DHCT shown in FIG. 3.

FIG. 4 illustrates a non limiting example of a remote control device 80 that is used to provide user input to the DHCT 16. The arrow buttons 82 include an up arrow button 83, a down arrow button 84, a left arrow button 85, and a right arrow button 86 that are used to scroll through options and/or to highlight an option. The select button 87 may be used to select a currently highlighted option that is provided to the user. Other buttons that are available on the remote control device will be discussed further below. Many alternative methods of providing user input may be used including a remote control device with different buttons and/or button layouts, a keyboard device, a voice activated device, etc. The invention described herein is not limited by the type of device used to provide user input.

Figure 5:
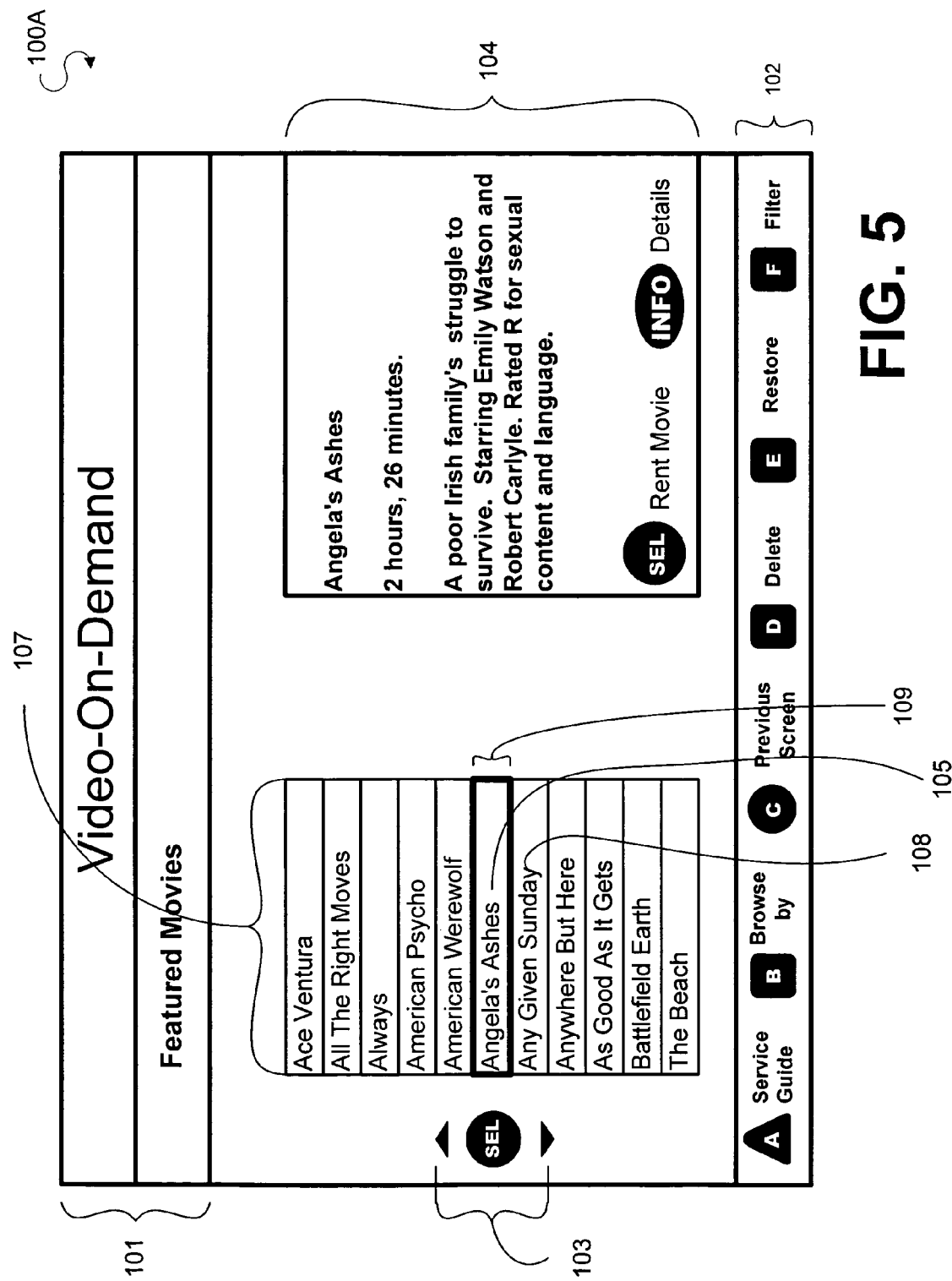
FIG. 5 depicts an example title selection window that illustrates a media title list presented to the user by the DHCT of FIG. 3.

With continued reference to FIGS. 3 and 4 throughout the remaining figures, FIG. 5 depicts an example media title deletion window 100A. As with other window examples discussed below, processor 44 executes program instructions of MOD client application 63 that cause it to direct the window manager 59 to create window 100A via display data that is formatted for television 41. Processor 44 stores the display data or parts thereof in DRAM 52 (as necessary) and transfers the display data to a display output system such as RF output system 48 wherein display data is converted to respective television signals and transmitted to television 41. Of course, the scope of the invention also includes any other method of causing the described windows to appear to the user.

The example window 100A contains a top portion 101 that typically contains one or more headings and a bottom portion 102 that typically illustrates relevant buttons available on the remote control device 80. Media title list 107 contains media titles that are retrieved by MOD client application 63 from application memory 70. Information section 104 contains information related to a media title shown in a highlighted title area 109, which in this example is "Angela's Ashes" 105. Browsing symbol 103 suggests to the user that the user may use the up and down arrow buttons 83, 84 on the remote control device 80 to browse the media title list 107 and use the select button 87 to request the currently highlighted media title. For example the user may activate the down arrow button on the remote control device in order to cause the media title "Any Given Sunday" 108 to be displayed in the highlighted title area 109 and then activate the select button 87 in order to request the movie. In an alternative embodiment activating the up an down arrows on the remote control device 80 would result in shifting the highlighted title area rather than shifting the media title list. The user may delete the media title currently shown in the highlighted title area 109 from the media title list 107 by pressing the "D" button 88 on the remote control device 80. Instead of a single dedicated key in an input device to invoke the delete functionality, in an alternate embodiment, a combination of keys pressed simultaneously or in sequential order are designated for deleting a highlighted media title.

Figure 6:
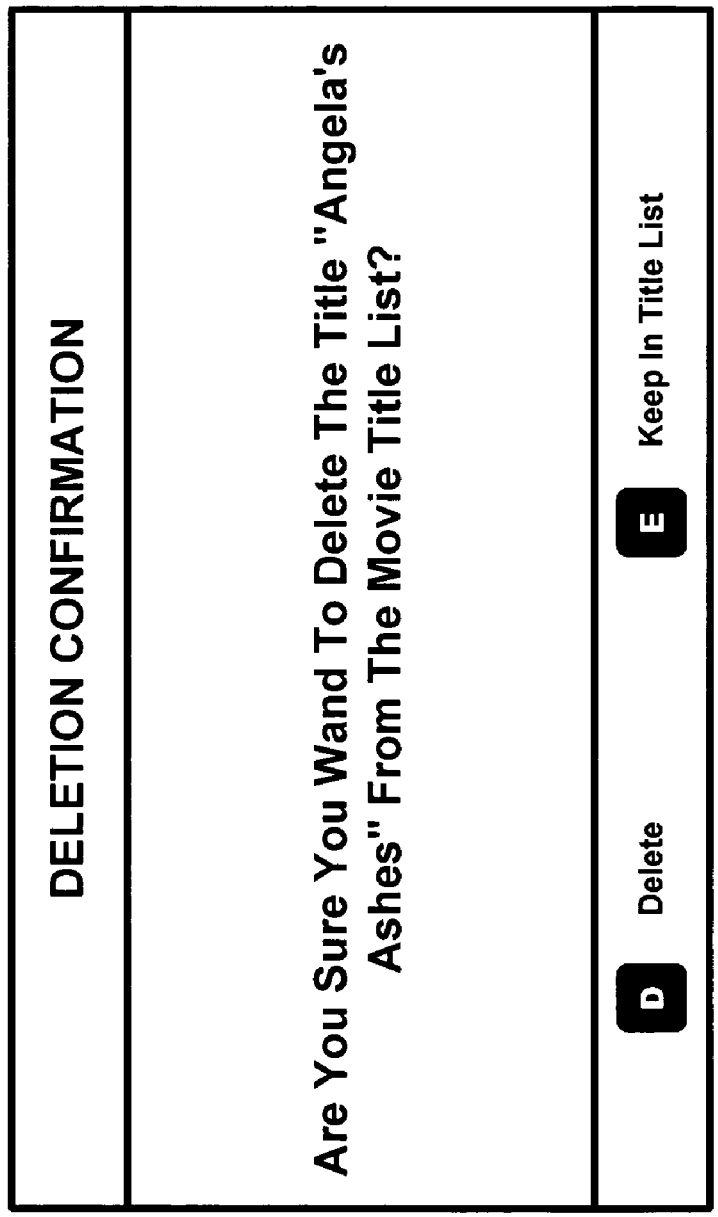
FIG. 6 depicts an example deletion confirmation window that is presented to a user after the user requests the deletion of a media title via the title selection window depicted in FIG. 5.

FIGS. 6 and 7 depict example confirmation windows 110A and 110B that serve as alternative intermediate confirmation steps prior to the implementation of a title deletion. This intermediate confirmation step ensures that the user wishes to delete the highlighted title from the media title list and reduces accidental deletions. Example window 110A prompts the user to either confirm the deletion by pressing the "D" button 88 or to cancel the deletion by pressing the "E" button 89. Example window 110B, on the other hand, prompts the user for input on whether the deletion is to be effective permanently (via the "D" button 88) or just during the current on-demand title selection session (via the "E" button 89). Information identifying a deleted media title and its corresponding deletion duration is stored in application memory 70, such as in a database, by MOD client application 63 in order prevent the deleted media title from being included in media title lists subsequently presented to the user, including after receiving additional title information from the MOD server application 19. A user may, however, undelete a media title by following the procedure illustrated further below.

Figure 8:
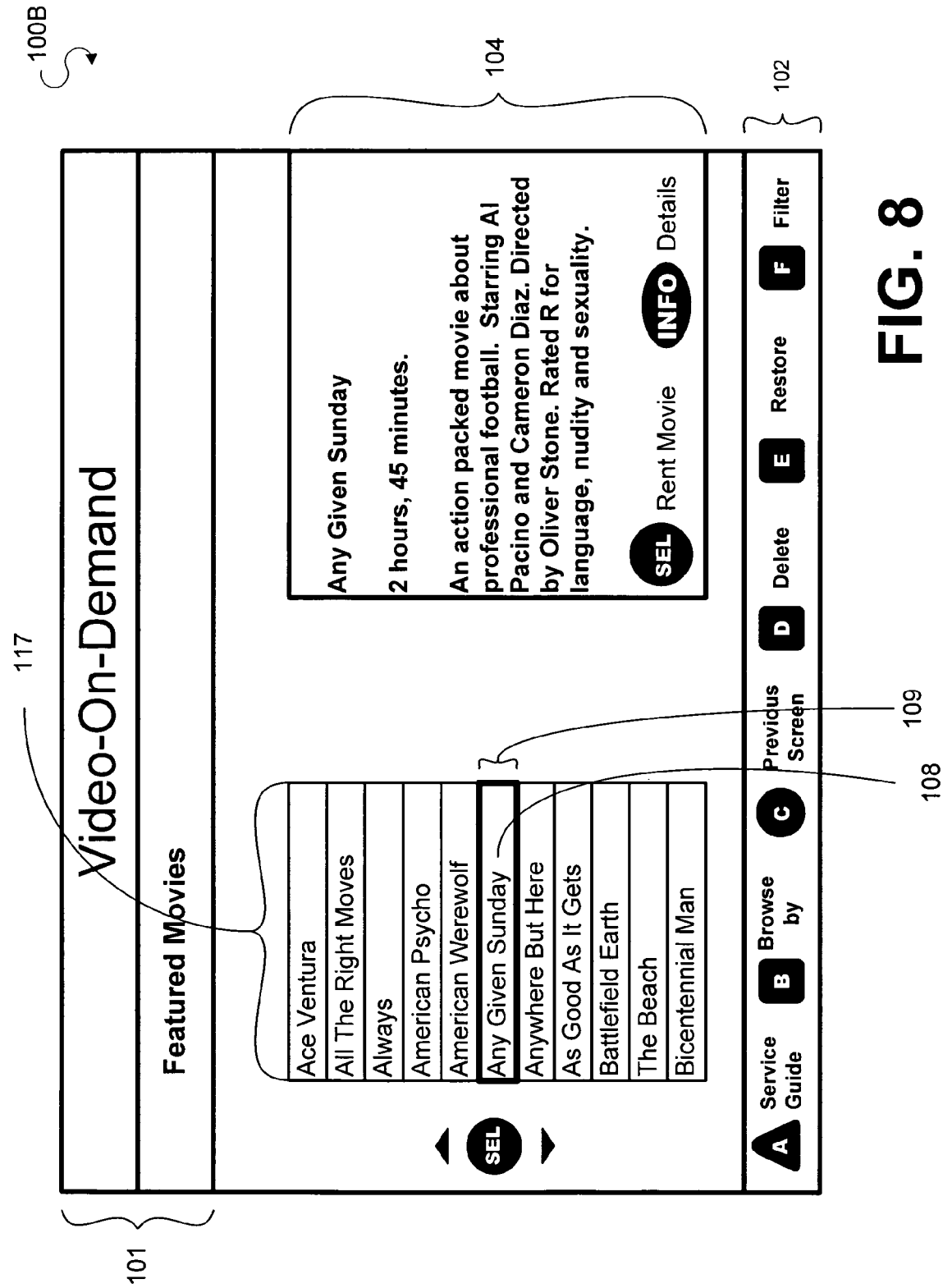
FIG. 8 depicts an example window that illustrates the deletion of a media title from the media title list of FIG. 5.

FIG. 8 depicts an example window 100B illustrating the deletion of a media title from the media title list 107 (FIG. 5). Example window 100B is presented to the user after the user activates the "D" button 88 on the remote control device 80 while being presented with example window 100A and then confirms the deletion request by re-activating the "D" button 88 while being presented with a confirmation window (110A or 110B). The media title previously shown in the highlighted title area 109 is deleted and replaced by the next media title on the media title list 107 (FIG. 5). In this example, the title "Angela's Ashes" 105 (FIG. 5) is deleted and replaced with the title "Any Given Sunday" 108.

Figure 9:
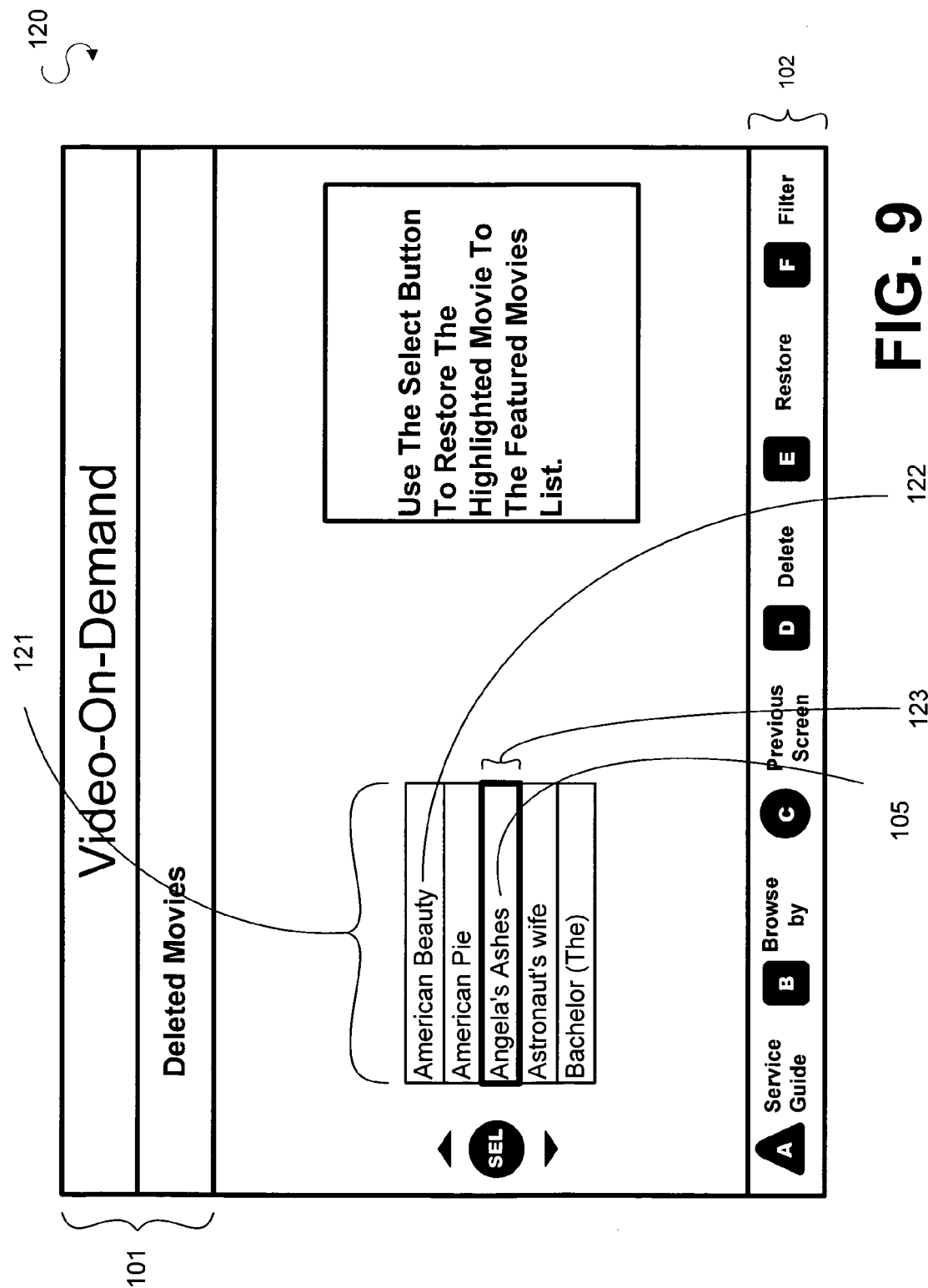
FIG. 9 depicts an example window that illustrates the process of restoring a deleted media title to the media title list shown in FIG. 8

FIG. 9 depicts an example window 120 illustrating the process of undeleting a media title. Example window 120 is presented to the user after the user activates the "E" button 89 on the remote control device 80 while being presented with example window 110 (FIG. 8). The user can undelete a highlighted media title by activating the select button 87. Upon being undeleted, a media title will no longer be identified in application memory 70 as being deleted and will be shown in media title lists subsequently presented to the user.

Figure 10:
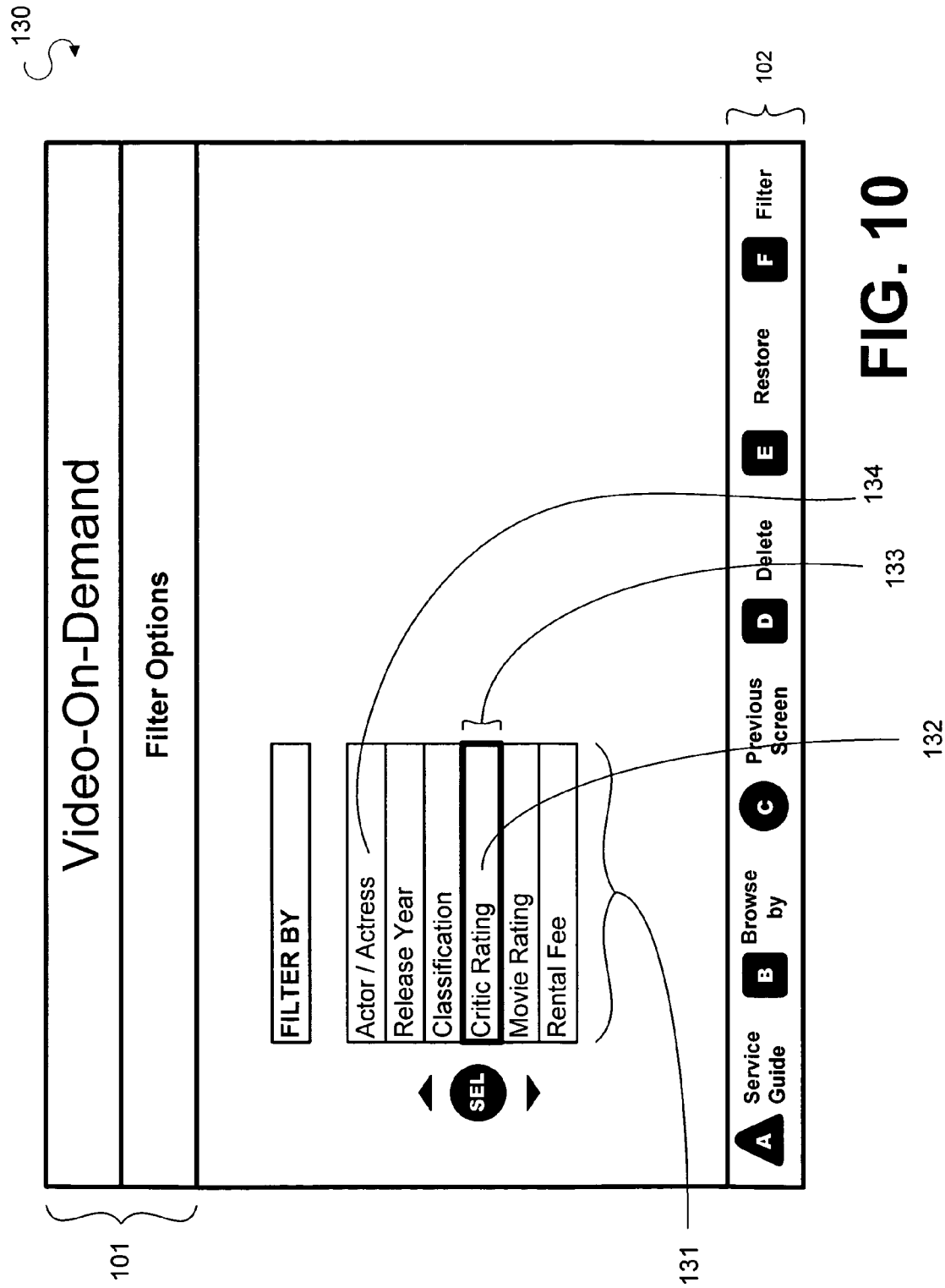
FIG. 10 depicts an example window that illustrates media filtering categories presented by the DHCT of FIG. 3.

FIG. 10 depicts an example window 130 illustrating media filtering categories. Example window 130 is presented to the user after the user activates the "F" button 90 on the remote control device 80. The filtering list 131 contains filtering categories, such as filtering category 132, and a highlighted filtering category area 133. A filtering category contains criteria that are used to remove or filter out media titles from media title lists that are presented to the user. Example filtering categories include release year (e.g. 1999), released after a year, released prior to a year, movie classification (such as comedy, drama, etc.), critic rating (such as one star, two star, etc.), movie rating (such as PG, PG-13, etc.), movies already viewed, and the cost of renting the movie. For example, in one implementation, the cost of renting a movie can be used as a filter to exclude movies that cost more than defined selectable amounts, and in another implementation, the user is able to enter the cost to use as the threshold. The user can use the remote control device 80 to select a desired media filtering category. Upon selection of a media filtering category, the user is presented with media filtering criteria falling under the selected media filtering category as illustrated in FIG. 11.

In an alternate embodiment, the MOD client application 63 comprises a text string matching sub-component that enables filtering based on text strings entered by the user for applicable filtering categories. For instance, the user can implement a filter to delete titles that feature a disliked leading actor or actress. Upon user selection of filter by leading actor/actress 134 in window 130, an intermediate window is displayed to the user for entering alphanumeric characters via an input device. In the absence of a keyboard, MOD client application causes display of a window comprising visual information for scrolling and selection of individual letters. A mapping of alphanumeric characters to input device keys can also be displayed to facilitate entering letters with the remote control device. Upon the user entering the name of a leading actor or actress, the media client application may proceed to verify correct name spelling by transmitting the input name to the MOD server. The MOD server sends an addressable message to DHCT 16 that gets input as data to MOD client application 63. The received message data from MOD server confirms the correct spelling, rectifies the spelling, or suggests close variants of the user-entered name. MOD client application 63 interprets the message data and presents it to the user. In the event that variants are displayed to the user, the user is prompted to select one of the displayed name variants or to cancel the filtering request.

In an alternate embodiment, a "filter in" function rather than a "filter out" function is implemented such that filter enactment causes those on-demand titles that do not match the filter's criteria to be removed from the media title list. Furthermore, when applicable, the function of a user-implemented filter can be selected by the user to function as a "filter in" or "filter out". Some filters in the set of available filters may not feature user-selectable "filter in" or "filter out" functionality but merely may default to either a "filter in" or "filter out" function. In an alternate embodiment, the MOD client application enacts capabilities to the user to filter only existing titles in the current media title list, to filter only future title additions to the media title list, or both.

Figure 11:
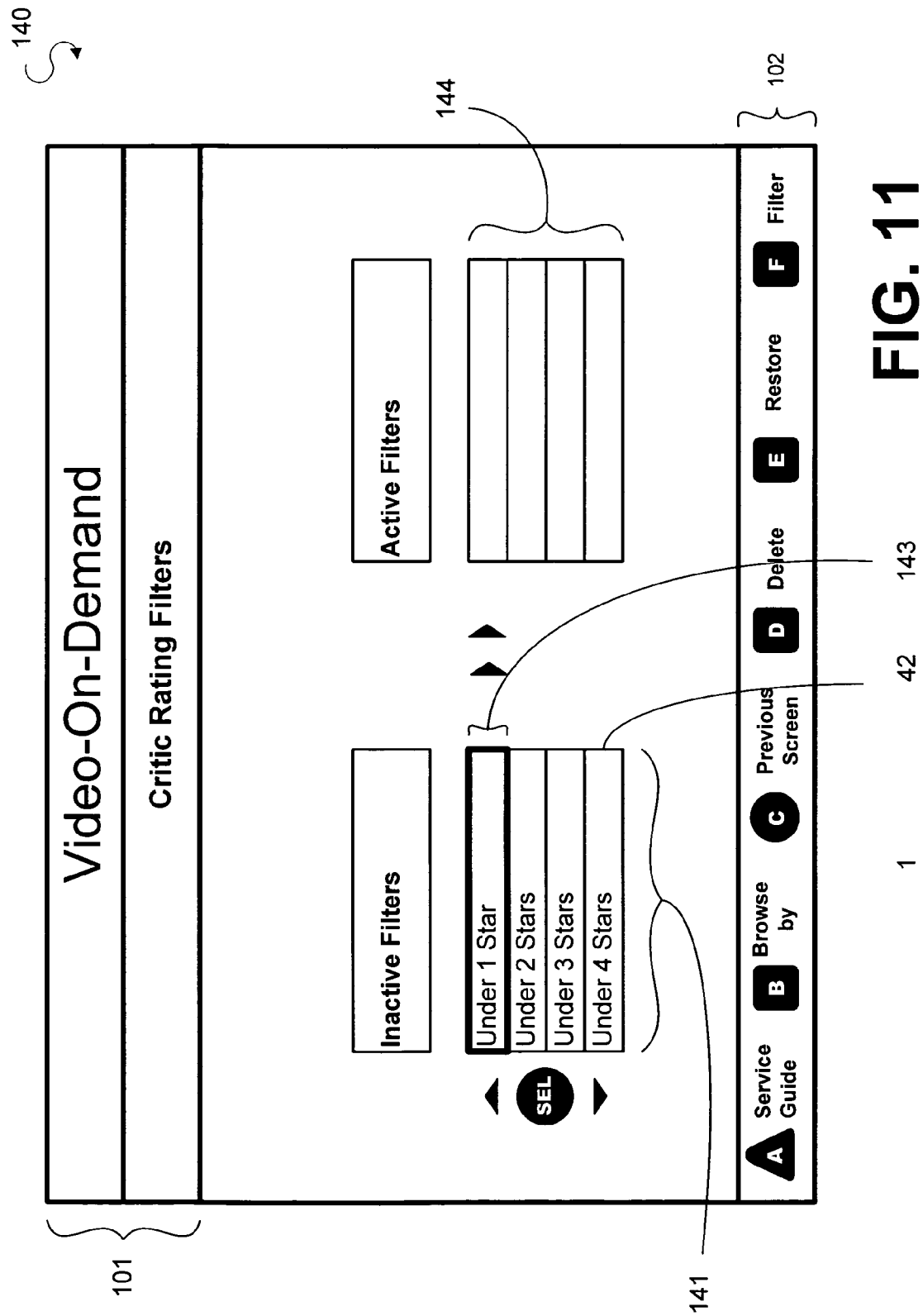
FIG. 11 depicts an example windows that illustrates filtering criteria corresponding to a filtering category shown in the example window of FIG. 10.
Figure 12:
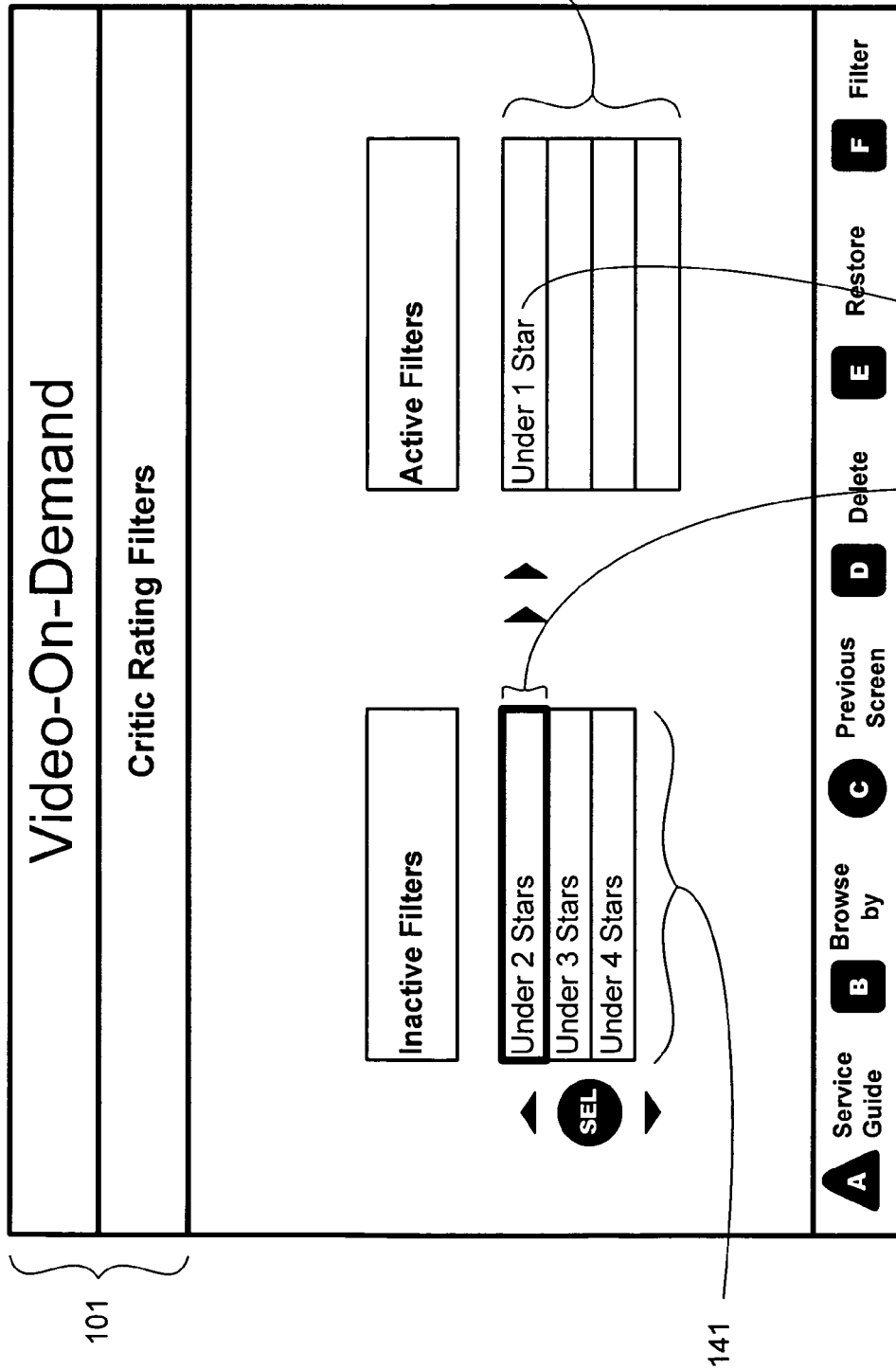
FIG. 12 depicts an example window that illustrates the activation of a filtering criterion shown in example window of FIG. 11.

FIGS. 11 and 12 are example windows 140 & 150 respectively illustrating the activation of a filtering criterion. The filtering criteria list 141 contains filtering criteria, such as filtering criterion 142, and a highlighted filtering criterion area 143. The user can use the remote control device 80 to select a desired filtering criteria. In this example, the user can filter out media titles corresponding to media titles that have critic ratings below one star by activating the select button on the remote control device 80. Referring now to FIG. 12, once a highlighted criterion is selected by the user, it becomes activated and is displayed in an active filters list 144. Upon activation, the filtering criterion is stored by MOD client application 63 in application memory 70 and is used to filter out media titles that meet the activated filtering criterion from media title lists that are presented to the user. In this example, media titles with critic ratings of under one star will be filtered out from media title lists that are presented to the user. In one embodiment, new media titles that are subsequently received by MOD client application 63 from MOD server application 19 (FIG. 2) are filtered according to currently active filtering criteria so that they are not included in media title lists presented to the user.

Figure 13:
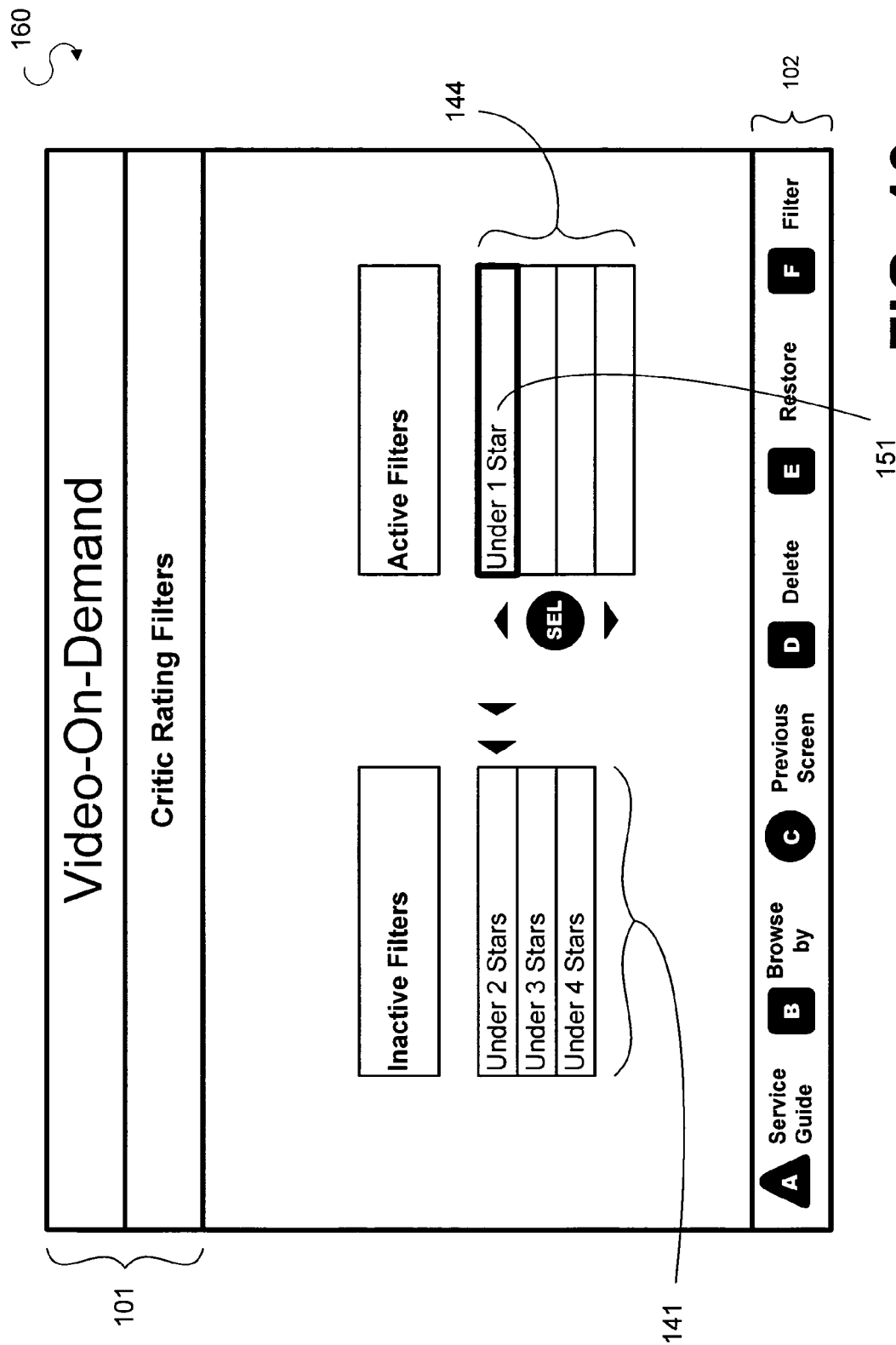
FIG. 13 depicts an example window that illustrates the de-activation of a filtering criterion shown in the example window of FIG. 12.

FIG. 13 depicts an example window 160 illustrating the de-activation of a filtering criterion. Example window 160 is presented to the user upon the activation of the right arrow button on the remote control device 80 while being presented with example window 150 (FIG. 12). Once an activated filtering criterion is selected by the user from the active filters list 144, it becomes de-activated, is removed from the active filters list 144, and is added back to the filtering criteria list 141. Upon de-activation, a filtering criterion is deleted from application memory 70 and is no longer used by the MOD client application 63 to filter out media titles.

Figure 14:
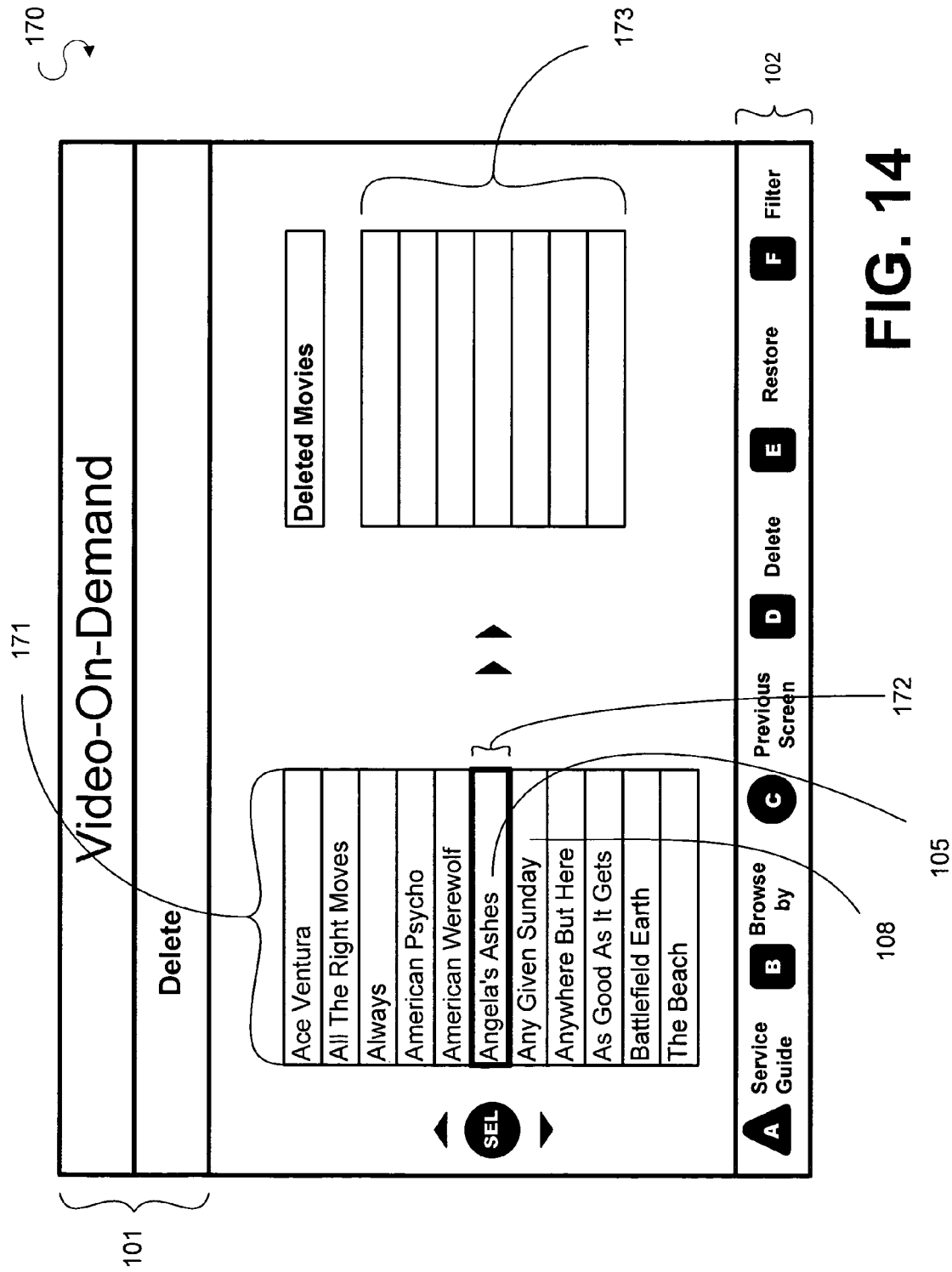
FIG. 14 depicts an alternative embodiment to the example window shown in FIG. 5, illustrating a media title list.
Figure 15:
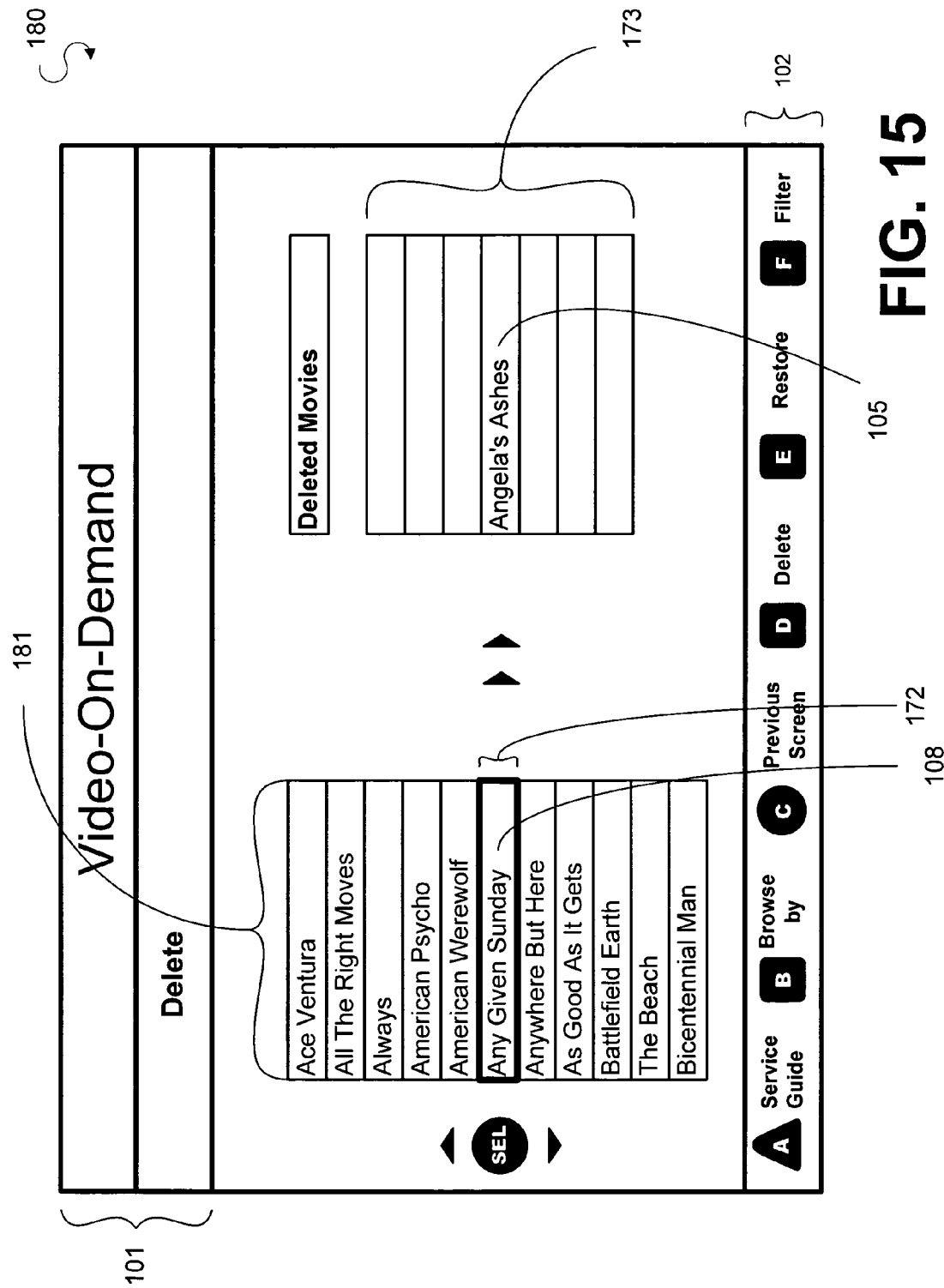
FIG. 15 depicts an alternative embodiment to the example window in FIG. 8, illustrating the deletion of a media title from the media title list shown in FIG. 14.

FIGS. 14 and 15 are example windows 170 and 180 respectively that illustrate an alternative embodiment to the media title deletion windows illustrated in FIGS. 5 and 8. In this embodiment, example window 170 is presented to the user after the user activates the "D" button 88 on the remote control device 80 while being presented with example window 100A (FIG. 5). The user may then activate the up and down arrow buttons 83, 84 on the remote control device 80 to browse the media title list 117 and the select button 87 to delete a currently highlighted media title from the media title list 171. Once a title is deleted from a media title list, it remains excluded from such list even after the list is presented to the user at a later time. The user may however restore a previously deleted title to the media title list from which it was deleted by following the procedure illustrated in FIG. 16. Referring now to FIG. 15, example window 180 is presented to the user after the user activates the select button 87 on the remote control device 80 while being presented with example window 170. The media title previously shown in the highlighted title area 172 is replaced by the next media title on the media title list 171 (FIG. 14) and is transferred to the deleted title list 173. In this example, the title "Angela's Ashes" 105 (FIG. 14) is replaced with the title "Any Given Sunday" 108 and is transferred to the deleted title list 173 as shown in FIG. 15.

Figure 16:
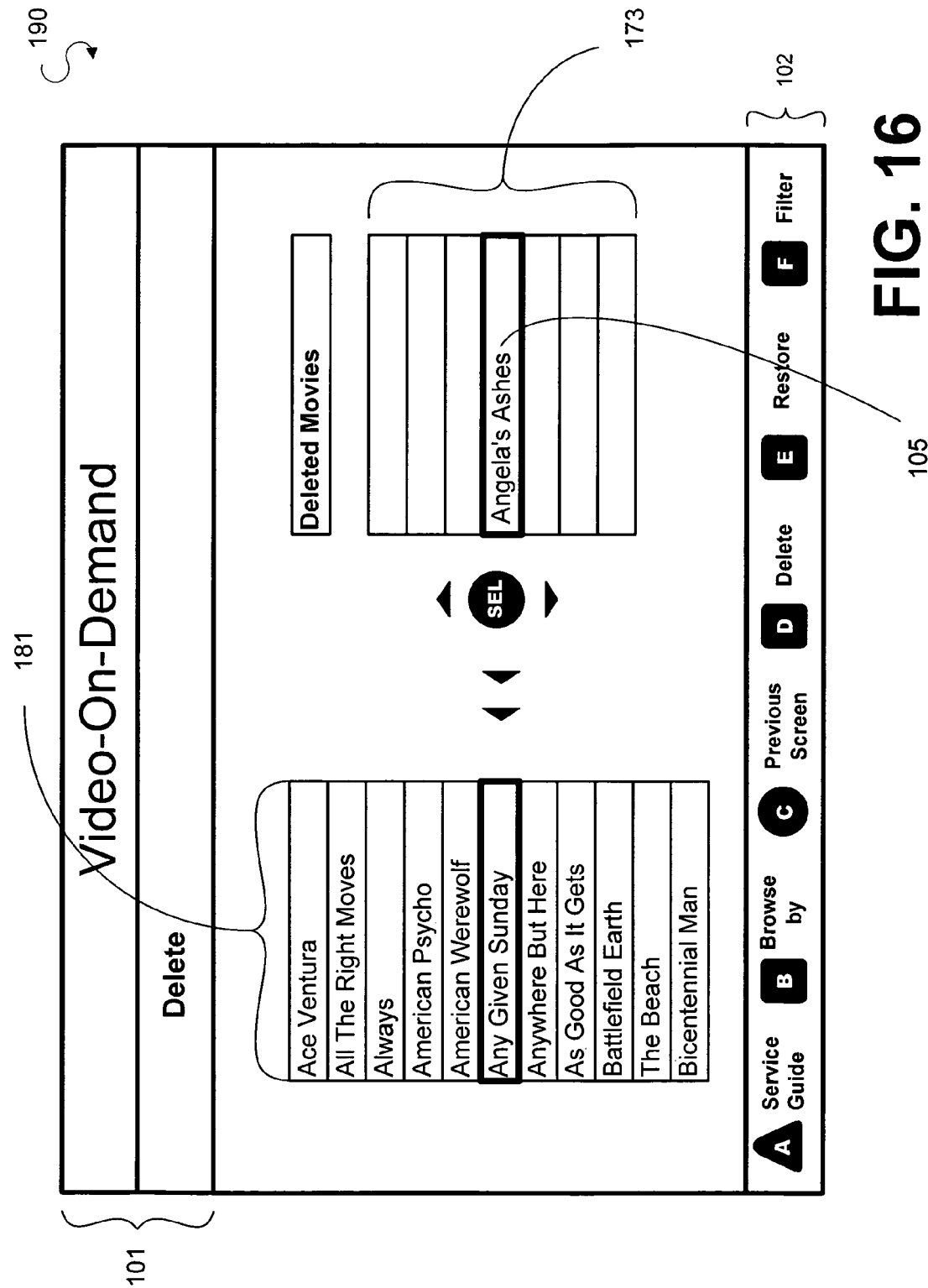
FIG. 16 depicts an example window that illustrates the process of restoring (undeleting) a deleted media title to the media title list shown in FIG. 15.

FIG. 16 depicts an example window 190 illustrating the process of undeleting a media title. Example window 190 is presented to the user after the user activates the right arrow button 86 on the remote control device 80 while being presented with example window 180 (FIG. 15). The user can undelete a highlighted media title by activating the select button 87. Once undeleted, a media title will be included in media title lists subsequently presented to the user.

In another embodiments, MOD client application 63 features the capability of creating a plurality of title removal or fine-tuning sets, each set designated to respectively retain the title viewing preferences of each individual viewer or member of the family. A title viewing preference set may simply be named with a suffice or prefix number or letter that individual viewers appropriate under personal agreements between themselves, or the set may be named by a user inputting alphanumeric strings with an input device such as a keyboard or remote control device.

It should be emphasized that the above-described embodiments of the present invention, particularly any "preferred embodiments", are merely possible examples of the implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

Therefore, having thus described the invention, the following is claimed:

1. An interactive media services client device for providing a user with media information received from a programmable television services server device, said client device comprising:
   memory for storing data, the memory further comprising media titles corresponding to a displayed media title list, the media title list having at least one of the media titles, each media title being displayed in a title area;
   a processor configured to:
   cause a title area containing a media title identified by user input to be removed from said media title list; and
   provide the user with a list of removed media titles, the list of removed media titles comprising the identified and removed media title that is provided to the user in the list of removed media titles subsequent to its removal.

2. The interactive media services client device of claim 1, wherein the user input is transmitted via a remote control device.

3. The interactive media services client device of claim 1, wherein the media title identified by said user is highlighted.

4. The interactive media services client device of claim 1, wherein the media title identified by said user input is a video-on-demand media title.

5. The interactive media services client device of claim 1, wherein said media title list is displayed via a television.

6. A programmable television services server device for providing media information to a user via an interactive media services client device, said server device comprising:
   memory for storing data, the memory further comprising media titles for populating a displayed media title list, the media title list having plural media titles from among the media titles, each media title of the plural media titles being displayed in a respective title area; and
   a processor configured to cause a title area containing one of the plural media titles identified by user input to be removed from said media title list, said processor being further configured to provide the user with a list of removed media titles that includes the one of the plural media titles, the list of removed media titles provided to the user subsequent to the removal of the one of the plural media titles.

7. The programmable television services server device of claim 6, wherein the user input is transmitted via a remote control device.

8. The programmable television services server device of claim 6, wherein the media title identified by said user is highlighted.

9. The programmable television services server device of claim 6, wherein the media title identified by said user input is a video-on-demand media title.

10. The programmable television services server device of claim 6, wherein said media title list is displayed via a television.

11. A method for providing media information to a user via an interactive media services client device coupled to a programmable television services server device, said method comprising:
    receiving user input selecting a filtering criterion, the filtering criterion displayed on a graphics user interface;
    implementing a filtering function on a media title list based on the selected filtering criterion, the filtering function capable of filtering-in and filtering-out functionality;

presenting for display a plurality of title areas each containing respective media titles of a subset of the media title list, the displayed plurality based on said filtering criterion; and providing the user with a displayed list of removed media titles, the removed media titles corresponding to those subject to the implemented filtering function.

12. The method of claim 11, wherein the media title is a media title that is received by the client device from the server device at a future time.

13. The method of claim 11, further comprising implementing in the future the filtering function exclusively on media titles added in the future to the plurality of title areas of the subset based on future selected filtering criterion.

14. The method of claim 11, further comprising implementing in the future the filtering function on the plurality of title areas of the subset based on future selected filtering criterion.

15. The method of claim 11, wherein the filtering criterion is selected from a displayed, pre-configured list of filtering criterion.

16. The method of claim 11, wherein said media title list contains video-on-demand media titles.

17. The method of claim 11, wherein said media title list is displayed via a television.

18. The method of claim 11, wherein said filtering criterion is selected from a group consisting of:
a release year, a movie classification, an actor/actress, a critic rating, a category, and a rental fee.

19. An interactive media services client device for providing a user with media information received from a programmable television services server device, said client device comprising:
memory for storing data, the memory further comprising media titles for a displayed media title list, each of the media titles being displayed in a respective title area; and
a processor configured to:
cause a title area containing at least one of the media titles to be deleted from said media title list;
store information identifying the deleted media title and a corresponding deletion duration in the memory; and
cause the deleted media title to be displayed based on the stored information.

20. The client device of claim 19, wherein the processor is further configured to cause the title area to be deleted based on user input that is transmitted via a remote control device.

21. The client device of claim 19, wherein the processor is further configured to cause the deleted media title to be displayed in a list adjacent to the media title list.

22. The client device of claim 19, wherein said media title list contains video-on-demand media titles.

23. The client device of claim 19, wherein said media title list is displayed via a television.

24. The client device of claim 19, wherein the processor is further configured to cause the deleted media title to be displayed in a window separate from the window in which the media title list is displayed.

25. A programmable television services server device for providing media information to a user via an interactive media services client device, said server device comprising:
memory for storing data, the memory further comprising media titles for populating a media title list, each media title being displayed in a respective title area; and
a processor configured to:
cause a title area containing a media title corresponding to a filtering criterion identified by user input to be excluded from said media title list; and
provide the user with a list of removed media titles.

26. The server device of claim 25, wherein the user input is transmitted via a remote control device.

27. The server device of claim 25, wherein the filtering criterion identified by said user is highlighted.

28. The server device of claim 25, wherein said media title list contains video-on-demand media titles.

29. The server device of claim 25, wherein said media title list is displayed via a television.

30. The server device of claim 25, wherein said filtering criterion is selected from a group consisting of:
a release year, a movie classification, an actor/actress, a critic rating, a category, and a rental fee.

31. The client device of claim 19, wherein said client device is a television set-top box.

32. The client device of claim 19, wherein data corresponding to said filtering criterion is stored in non-volatile memory.

33. The method of claim 11, wherein said filtering criterion is whether said user had previously been provided with a media presentation corresponding to said media title.

34. The method of claim 11, wherein said filtering criterion is a text string entered by said user.

35. The method of claim 34, further comprising comparing said text string to other text strings; and providing said user with alternative text string selections.

36. The method of claim 35, further comprising prompting said user to select a filtering criterion that corresponds to said text string.

37. The method of claim 35, further comprising prompting said user to select an alternative text string.

38. The method of claim 11, further comprising:
receiving user input identifying a second filtering criterion; and
excluding a media title that does not meet said second filtering criterion from said media title list.

39. The method of claim 11, wherein a video presentation identified by said media title is currently available to said user via said client device.

40. The method of claim 11, wherein a video presentation identified by said media title is not currently available to said user via said client device.

41. A media services system for providing media information to a user via an interactive media services client device coupled to a programmable media services server device, said system comprising:
memory having titles for display in a media title list, each media title being displayed in a title area; and
logic stored in said memory, said logic being configured to:
cause a title area containing a media title corresponding to a filtering criterion identified by user input to be excluded from a media title list; and
provide the user with a list of removed media titles.

42. The system of claim 41, wherein each of a plurality of users provides user input identifying a filtering criterion.

43. The system of claim 42, wherein a plurality of filtering criteria corresponding to a plurality of users are stored in memory.

44. The system of claim 42, wherein each of said plurality of users is presented with a media title list.

45. The system of claim 41, wherein said filtering criterion is based on whether said user had previously been provided with a media presentation corresponding to said media title.

46. The system of claim 41, wherein said user input is a text string.

47. The system of claim 46, further comprising logic configured to cause said client device to prompt said user to select a filtering criterion that corresponds to said text string.

48. The system of claim 46, further comprising logic configured to cause said client device to prompt said user to select an alternative text string.

49. The system of claim 41, further comprising logic configured to cause a media title that does not meet a second filtering criterion identified by user input to be excluded from said media title list.

50. The system of claim 41, wherein a video presentation identified by said media title is currently available to said user via said client device.

51. The system of claim 41, wherein a video presentation identified by said media title is not currently available to said user via said client device.

* * * * *